US005717079A

United States Patent [19]

Viski et al.

[11] Patent Number: 5,717,079

[45] Date of Patent: Feb. 10, 1998

[54] COLOR-PROVIDING COMPOUNDS

[75] Inventors: Peter Viski; David P. Waller, both of Lexington, Mass.

[73] Assignee: Polaroid Corporation, Cambridge, Mass.

[21] Appl. No.: 815,281

[22] Filed: Mar. 10, 1997

Related U.S. Application Data

[60] Division of Ser. No. 754,286, Nov. 20, 1996, Pat. No. 5,658,705, which is a continuation-in-part of Ser. No. 607,296, Feb. 26, 1996, abandoned.

[51] Int. Cl.$^6$ .......... C09B 29/28; C09B 29/50; C09B 57/14

[52] U.S. Cl. .......... 534/649; 534/775; 534/798; 548/146; 548/181

[58] Field of Search .......... 534/649; 548/146, 548/181

[56] References Cited

U.S. PATENT DOCUMENTS

| | | | |
|---|---|---|---|
| 3,719,489 | 3/1973 | Ciecuich et al. | 430/222 |
| 3,929,760 | 12/1975 | Landholm et al. | 534/648 |
| 3,942,987 | 3/1976 | Landholm et al. | 430/223 |
| 3,954,476 | 5/1976 | Krutak, Sr. et al. | 430/223 |
| 4,013,635 | 3/1977 | Landholm et al. | 534/648 |
| 4,098,783 | 7/1978 | Ciecuich et al. | 534/648 |
| 4,415,737 | 11/1983 | Herchen et al. | 548/146 |
| 4,556,632 | 12/1985 | Sato et al. | 430/562 |
| 4,598,158 | 7/1986 | Herchen et al. | 548/146 X |
| 4,619,784 | 10/1986 | Locatell, Jr. | 548/181 X |
| 5,223,387 | 6/1993 | Tsukase et al. | 430/562 |
| 5,320,929 | 6/1994 | Arnost | 430/200 |
| 5,340,689 | 8/1994 | Chinoporos et al. | 430/200 |
| 5,415,970 | 5/1995 | Arnost et al. | 430/200 |
| 5,430,156 | 7/1995 | Arnost et al. | 548/146 |

FOREIGN PATENT DOCUMENTS

| | | |
|---|---|---|
| 656562 | 6/1995 | European Pat. Off. . |
| 59-180548 | 10/1984 | Japan . |

*Primary Examiner*—Fiona T. Powers
*Attorney, Agent, or Firm*—Jennifer A. Kispert

[57] ABSTRACT

There are described color-providing compounds having at least two cyclic 1,3-sulfur-nitrogen moieties and one complete dye or dye intermediate. The color-providing compound is stable in the photographic processing composition but capable of undergoing cleavage in the presence of an imagewise distribution of silver ions and/or soluble silver complex made available as a function of development to liberate a complete dye or dye intermediate in an imagewise distribution corresponding to that of the silver ion and/or the soluble silver complex. The color-providing compounds are useful as image-forming materials in color photographic, photothermographic, thermographic, and other processes.

7 Claims, No Drawings

COLOR-PROVIDING COMPOUNDS

CROSS-REFERENCE TO RELATED APPLICATIONS

This is a division of application Ser. No. 08/754,286, filed Nov. 20, 1996, now U.S. Pat. No. 5,658,705, which is a continuation-in-part of application Ser. No. 08/607,296, filed Feb. 26, 1996, now abandoned.

BACKGROUND OF THE INVENTION

The present invention relates to image-recording elements and, more particularly, to color-providing compounds which, in the presence of silver ions and/or a soluble silver complex, undergo a cleavage reaction to liberate a color-providing moiety.

It is well known that various cleavage reactions are assisted by silver ions including reactions involving cleavage of a compound into one or more fragments. For example, U.S. Pat. No. 3,719,489 discloses silver ion assisted cleavage reactions useful in photographic systems. As disclosed therein, compounds are capable of undergoing cleavage in the presence of silver ions made available imagewise during processing of a silver halide emulsion to liberate a reagent, such as, a photographically active reagent comprising, for example, a color-providing compound, in an imagewise distribution corresponding to that of said silver ions. It is well known in the art that compounds useful for liberating a reagent include 1,3-sulfur-nitrogen compounds, e.g., thiazolidines, and their vinyl and phenylene analogs. In addition, U.S. Pat. No. 5,569,574 discloses the use of 1,3-sulfur-oxygen compounds in silver assisted cleavage reactions to liberate a reagent.

In one embodiment disclosed in U.S. Pat. No. 3,719,489, color images are produced by using as the compounds, color-providing compounds which are substantially non-diffusible in the photographic processing composition but capable of undergoing cleavage in the presence of the imagewise distribution of silver ions and/or soluble silver complex made available in the undeveloped and partially developed areas of a silver halide emulsion as a function of development to liberate a more mobile and diffusible color-providing moiety up in an imagewise distribution corresponding to the imagewise distribution of said ions and/or said complex. The subsequent formation of a color image is the result of the differential in diffusibility between the parent compound and liberated color-providing group whereby the imagewise distribution of the more diffusible color-providing moiety released in the undeveloped and partially developed areas is free to transfer.

Color-providing compounds useful in the above process form the subject matter of U.S. Pat. No. 4,098,783, a continuation in part of said U.S. Pat. No. 3,719,489. The color-providing compounds disclosed therein may include one or more dye radicals and one or more 1,3-sulfur-nitrogen moieties. For example, they may comprise one complete dye or dye intermediate and one cyclic 1,3-sulfur-nitrogen moiety. Alternatively, the color-providing compounds may comprise two or more cyclic moieties for each dye radical or dye intermediate or vice versa. In contrast, the dye-providing compounds of the present invention comprise two cyclic 1,3-sulfur-nitrogen moieties and one dye radical or dye intermediate. The presence of two cyclic moieties mandates that two silver ion assisted cleavage reactions occur prior to release of the dye or dye intermediate, thus, a desirable decrease in non-specific release of the dye or dye intermediate is effectuated. Furthermore, the presence of the solubilizing groups, e.g., —$NHSO_2$, OH, on the dye-providing compound result in very rapid transfer of the dye or dye intermediate to the image-receiving element.

As stated earlier, the color-providing compounds according to the present invention are useful for forming color images in thermographic imaging systems processed by imagewise heating and in photographic imaging systems utilizing silver halide wherein the method of processing employs either wet processing to develop the image or thermal processing which develops the image by heating. Of particular interest are the integral-type film configuration photographic imaging systems utilizing silver halide and employing wet processing.

Color photosensitive imaging materials are well known in the art. Further, it is known in the an that such imaging materials may include various image dye-providing materials to provide the desired image. For example, Japanese Kokai 59-180548 having a Laid-Open date of Oct. 13, 1984 discloses a heat-developable silver halide photosensitive imaging system wherein the dye-providing material contains a heterocyclic ring containing a nitrogen atom and a sulfur or selenium atom which heterocyclic ring is subject to cleavage in the presence of silver ions to release a diffusible dye.

As mentioned above, an example of a suitable dye-providing material is a thiazolidine dye such as disclosed in U.S. Pat. No. 4,098,783. The process involves imagewise exposing the photosensitive system to light and subsequently or simultaneously heating the photosensitive system, in the presence of a base or base precursor, under a substantially water-free condition whereby an oxidation-reduction reaction between the exposed photosensitive silver halide and a reducing agent occurs. In the exposed areas, a negative silver image is formed. In the unexposed areas, the silver ion, present in inverse proportion to the silver image, causes the heterocyclic ring of the dye-providing material to be cleaved, releasing a diffusible dye. The diffusible dye is then transferred to an image-receiving layer, whereby a positive dye image is formed.

However, while the differential in diffusibility between the parent compound and the liberated color-providing moiety, disclosed in U.S. Pat. No. 3,719,489, is useful in obtaining a color image, under some conditions a small amount of the parent compound may also transfer. One way to lessen the diffusion of uncleaved dye-providing material is to use additional dye providing radicals as ballast groups. Another way to lessen the diffusion of uncleaved dye-providing material is to add additional ballasting groups and/or to increase the size of the ballast groups. U.S. Pat. No. 5,320,929 teaches the decrease in diffusion of particular color-providing compounds by using additional color-providing radicals, e.g., cyclic 1,3-sulfur-nitrogen moieties, and/or ballast groups. U.S. Pat. No. 5,415,970 discloses additional dye providing radicals as ballast groups to decrease diffusion of the uncleaved parent compound to the receptive layer of the film unit while increasing the image-forming efficiency of the color-providing materials, i.e., releasing more dye-providing moieties per molecule of uncleaved color-providing material. However, while these techniques do lessen such diffusion of the uncleaved parent compound to the receptive layer of the film unit, the results obtained are not entirely satisfying.

As the state of the art advances, novel approaches continue to be sought in order to attain the required performance criteria for these photographic systems. The present invention relates to dye-providing compounds.

SUMMARY OF THE INVENTION

There are provided according to the invention color-providing compounds represented by formula (I)

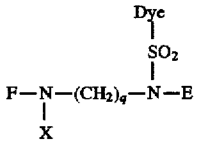

(I)

wherein:

Dye represents a complete dye or dye intermediate;

q is 2, 3 or 4;

E and F are each independently hydrogen or

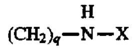

provided that at least one of E and F is

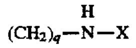

X is

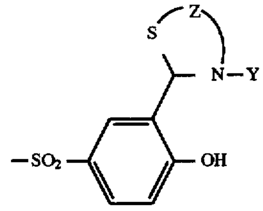

Z represents the carbon atoms necessary to complete an unsubstituted or substituted 5- or 6-membered heterocyclic ring system; and Y represents a photographically acceptable substituent. Typical suitable photographically acceptable substituents include:

(a) linear or branched alkyl ($C_nH_{2n+1}$); preferably having from 1 to 22 carbon atoms;

(b) cycloalkyl such as cyclohexyl;

(c) aryl group such as phenyl, 1-naphthyl, or aralkyl such as

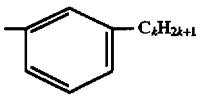

preferably having from 7 to 1 8 carbon atoms;

(d) heterocyclic group such as 2-pyridyl; and each of (a)-(d) may be substituted with a substituent which can be represented as $R_6$ where $R_6$ can be, for example, halogen such as trifluoromethyl; alkaryl such as

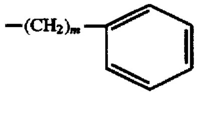

wherein m is 1, 2 or 3, preferably, m is 1; alkenyl having from 1 to 6 carbon atoms such as 2-propenyl; alkoxy having from 1 to 6 carbon atoms such as methoxy or ethoxy; aryloxy such as phenoxy, e.g., 2,4-di-t-amylphenoxy; carbonoxy such as alkylcarbonyloxy, e.g., acetyloxy; alkylsulfonyloxy such as methanesulfonyloxy; amino such as dimethylamino; arylamino such as anilino or p-t-octylanilino; sulfonylamino such as methanesulfonylamino; arylsulfonamino such as p-toluenesulfonyl; cycloalkyl such as cyclohexyl; or a heterocyclic group such as 2-pyridyl.

As stated previously, Y is preferably alkyl having from 1 to 22 carbon atoms. In a particularly preferred embodiment Y is alkyl having from 1 to 9 carbon atoms such as methyl, ethyl or isopropyl. In another preferred embodiment Y is aralkyl having from 7 to 18 carbon atoms.

In a preferred embodiment, Y is a ballast group, i.e., a group which renders the compound substantially immobile and nondiffusible in the imaging media. When the compounds represented by formula (I) are incorporated in the photographic image-recording elements of the invention, it is necessary that the unsubstituted or substituted 5- or 6-membered heterocyclic ring system undergo ring-opening during photographic processing. Thus, since Y is attached to the nitrogen atom of the ring system, any group, e.g., ballast group, which would not interfere with ring-opening is preferred. A preferred ballast group is an alkyl group having at least 10 carbon atoms, and preferably having from 10 to 22 carbon atoms such as $C_{18}H_{37}$ or $C_{22}H_{45}$. Another preferred ballast group is an aralkyl group having at least 12 carbon atoms, and preferably having from 12 to 18 carbon atoms such as

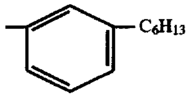

or

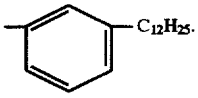

It should also be noted that a ballast group may be attached also to at least one of the carbon atoms represented by Z in formula (I). Another way to render the compound of the present invention substantially immobile and nondiffusible in the imaging media is to use additional color-providing moieties as ballast groups, such as disclosed and claimed in, for example, U.S. Pat. No. 5,430,156 wherein the color-providing moieties are connected to each other by multivalent chemical linkages which link the cyclic 1,3-sulfur-nitrogen groups through the nitrogen atom or the carbon atoms of the, e.g., thiazolidine, ring system.

As illustrated by formula (I), the color-providing compounds of the invention may have two or more cyclic 1,3-sulfur-nitrogen groups. Preferably, the color-providing compounds of the invention have two cyclic 1,3-sulfur-nitrogen moieties symmetrically-linked as shown by formula (II).

In addition to the color-providing compounds of formula (I), the present invention also provides dyes or dye intermediates which are released from the dye-providing compounds upon the silver ion assisted cleavage of the above-described dye-providing compounds.

The present invention further provides photographic, photothermographic and thermographic diffusion transfer image-recording elements using the above described dye-providing compounds. For example, the compounds of the present invention are useful in photographic imaging systems utilizing silver halide wherein the method of processing employs either wet processing to develop the image such as disclosed in U.S. Pat. Nos. 3,719,489 and 4,740,448, photothermographic or thermographic processing wherein image formation includes a heating step. As mentioned previously, the thermally processed photographic systems may be those processed in the presence or absence of water. In addition, the thermally processed photographic systems may be those processed in the presence or absence of a base or a base-precursor, i.e., a compound which generates a base under the processing conditions, such as those disclosed in U.S. Pat. No. 3,260,598.

According to the present invention, the color-providing compounds are capable of releasing a color providing group in the presence of the imagewise distribution of silver ions or silver salt complex made available during processing of a silver halide emulsion, in an imagewise distribution corresponding to that of the silver ions.

Another use of the color-providing compounds is in thermographic imaging systems where a source of silver ions or a soluble silver complex becomes available, upon heating in an imagewise manner, to cleave the color-providing compound.

One of skill in the art will be able to choose from among the color-providing compounds of the invention by choice of substituents, e.g., solubilizing groups such as carboxylic acids, sulfonic acids, and phosphonic acids, so that they will function as desired in a particular system.

These and other objects and advantages which are provided in accordance with the invention will in part be obvious and in part be described hereinafter in conjunction with the detailed description of various preferred embodiments of the invention. The invention accordingly comprises the processes involving the several steps and relation and order of one or more of such steps with respect to each of the others, and the product and compositions possessing the features, properties and relation of elements which are exemplified in the following detailed disclosure, and the scope of the application of which will be indicated in the claims.

For a fuller understanding of the nature and objects of the invention, reference should be had to the following detailed description of the preferred embodiments.

DETAILED DESCRIPTION OF THE PREFERRED EMBODIMENTS

The compound of the present invention, represented by formula (I), contains at least two cyclic 1,3-sulfur-nitrogen moieties, having the group —S—C—N— included in the ring, and one complete dye or dye intermediate. The cyclic moiety containing the group —S—C—N— included in the ring undergoes cleavage between the sulfur atom and the carbon atom common to the sulfur and nitrogen atoms and between the nitrogen atom and the common carbon atom in the presence of silver ions or a soluble silver complex to release the color-providing moiety. Cleavage occurs in the presence of the imagewise distribution of silver ions and/or soluble silver complex made available in the undeveloped and partially developed areas of the photosensitive emulsion in an imagewise distribution corresponding to the imagewise distribution of said ions and/or said complex. Upon cleavage of the ring, a more mobile and diffusible reagent is liberated which contains a dye or dye intermediate.

The term color-providing moiety is used herein to mean a complete dye or dye intermediate capable of yielding a complete dye upon subsequent reaction. The term "complete dye" is used herein to mean a dye radical comprising the chromophoric system of a dye.

The color-providing compounds of the present invention may be symmetrical or asymmetrical with respect to the location of the two cyclic 1,3-sulfur-nitrogen moieties, as illustrated, for example, by formulae (II) and (III) below:

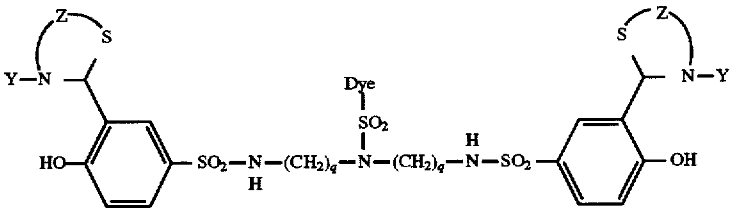

(II)

symmetrical link and

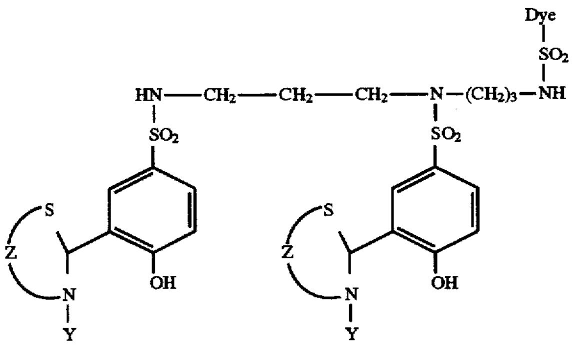

(III)

asymmetrical link wherein:

Dye, Z, Y and q are as described above.

Another embodiment of the color-providing compounds of the present invention may be represented as shown in formula (IV)

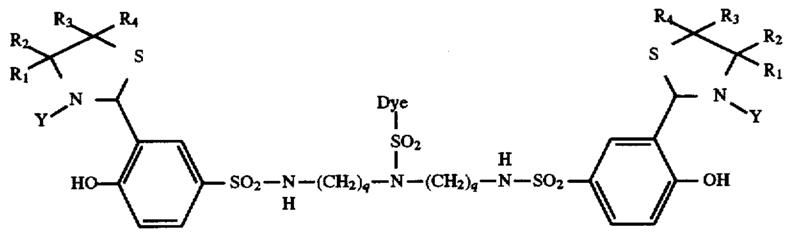

(IV)

wherein:

Dye, Y and q are as described above; and $R_1$, $R_2$, $R_3$, and $R_4$ are each independently hydrogen, a monovalent organic radical such as a phenyl ring, an alkyl group, or a ballast group such as alkyl having at least 10 carbon atoms, preferably having from 10 to 22 carbon atoms, or aralkyl having at least 12 carbon atoms, preferably having from 12 to 18 carbon atoms, or taken together, $R_1$ and $R_2$, $R_2$ and $R_3$, or $R_3$ and $R_4$ represent a substituted or unsubstituted 5- or 6-membered carbocyclic or heterocyclic ring, provided that when Y is not a ballast group, at least one of $R_1$, $R_2$, $R_3$ or $R_4$ is a ballast group.

As stated earlier, when the compounds represented by formula (I) are incorporated in the photographic image-recording elements of the invention, it is necessary that the unsubstituted or substituted 5- or 6-membered heterocyclic ring system undergo ring-opening during photographic processing, and since Y is attached to the nitrogen atom of the ring system, any group, e.g., ballast group, which would not interfere with ring-opening is preferred. As will be appreciated by formula (IV), $R_1$, $R_2$, $R_3$ and $R_4$ are attached to carbon atoms. Therefore, when at least one of $R_1$, $R_2$, $R_3$ or $R_4$ is a ballast group, the ballast group may be those described previously for Y, or any other suitable ballast group known in the art, for example, as disclosed in U.S. Pat. Nos. 5,320,929 and 5,415,970.

The color-providing moieties according to the present invention may be complete dyes or dye intermediates capable of yielding complete dyes upon subsequent reaction, for example, upon reaction with a suitable coupler to form a complete dye. The coupling reaction may take place directly after cleavage of the cyclic 1,3-sulfur-nitrogen groups to liberate the dye intermediate, or it may take place after diffusion of the dye intermediate to, e.g., the image-receiving layer.

Complete dyes which may be used in the present invention include any of the general classes of dyes heretofore known in the art, for example, nitro, thiazole, cyanine, di- and triphenylmethane, anthrapyridone, azo such as shown in examples IV and V herein, anthraquinone, phthalocyanine and metal complexed azo, azomethine and phthalocyanine dyes. Specific radicals of organic dyes that may be used include the dye radicals comprising the dye portion of the dye developers disclosed in U.S. Pat. Nos. 3,076,808; 3,076,820; 3,134,762; 3,134,763; 3,134,764; 3,134,765; 3,135,734; 3,173,906; 3,186,982; 3,201,384; 3,208,991; 3,209,016; 3,218,312; 3,236,864; 3,236,865; 3,246,016; 3,252,969; 3,253,001; 3,255,206; 3,262,924; 3,275,617; 3,282,913; 3,288,778; 3,299,041; 3,303,183; 3,306,891; 3,337,524; 3,337,589; 3,357,969; 3,365,441; 3,424,742; 3,482,972; 3,491,127; 3,544,545; 3,551,406; 3,597,200; 3,752,836; 4,264,701; and 4,267,251.

The dye intermediates which may be used in the present invention may be any molecule which when released is capable of forming a dye upon reaction with another molecule. For example, see U.S. Pat. No. 3,719,488 which discloses the use of 1,3-sulfur-nitrogen compounds to provide the imagewise distribution of dye intermediate and/or color-forming reagent, e.g., a colorless aldehyde or ketone dye intermediate which, when released is capable of reacting with a color-forming reagent, such as a methylene coupler, to form a complete dye.

In addition to the above, useful color-providing groups include compounds which are colorless or of a color other than that ultimately desired in a certain environment, such as at a particular pH level, but upon a change in the environment, e.g., from acid to alkaline conditions, undergo a color change. Color-providing materials of this nature include indicator dyes and leuco dyes. It is also contemplated that dyes may be employed which undergo a color shift or change in spectral absorption characteristics during or after processing. Such dyes may be referred to as 'temporarily shifted' dyes. The temporary shift may, for example, be effected by acylation, the acyl group being removable by hydrolysis in an alkaline environment, see for example, U.S. Pat. No. 4,535,051. It is also within the scope of the present invention to employ metal complexed or metal complexable dyes and to employ dyes, the non-complexed forms of which are substantially colorless, but which, when complexed during or subsequent to image formation, are of the desired color.

The choice of color-providing group is primarily limited by the spectral characteristics it is desired to have in the dye product comprising the dye radical and the cyclic 1,3-sulfur-nitrogen moieties.

The color-providing moieties are linked indirectly to the ring system through the appropriate linking group, for example, as represented by formulae (V) and (VI) below:

(V)

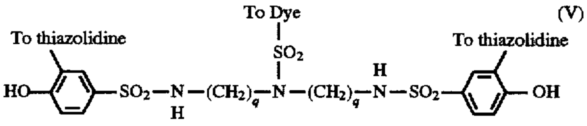

wherein:

q is as described above; and (VI)

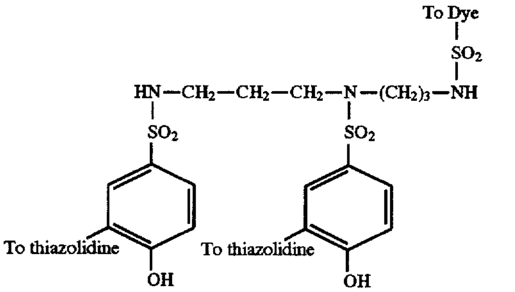

Linking groups are well known in the photographic art, and as discussed in U.S. Pat. Nos. 2,983,606 and 3,255,001, they are used to unite a dye radical of a desired predetermined color with a group possessing a silver halide developing function to obtain a dye developer. Ordinarily, the linking group functions as an insulating linkage to prevent or interrupt any system of conjugation or resonance extending from the dye radical comprising the chromophoric system of a dye to the developer group.

Preferably, q is 3 the linking groups used in the compounds of the invention to connect the complete dye or dye intermediate to the cyclic 1,3-sulfur-nitrogen groups.

As stated earlier, the cyclic 1,3-sulfur-nitrogen groups are either substituted or unsubstituted 5- or 6-membered heterocyclic rings. Accordingly, Z in formula (I), represents the atoms necessary to complete either a substituted or unsubstituted 5- or 6-membered heterocyclic ring. Preferably, the heterocyclic ring is a 5-membered thiazolidine ring as represented by formula (IV) above. As mentioned previously, one of skill in the art will be able to choose from among the compounds of the invention by choice of substituents, e.g., solubilizing groups such as those described in U.S. Pat. No. 4,886,744, so that they will function as desired in a particular system.

Preferably, Y, in formula (I), is an alkyl ballast group having at least 10 carbon atoms, preferably, having from 10 to 22 carbon atoms, or an aralkyl ballast group having at least 12 carbon atoms, preferably, having from 12 to 18 carbon atoms. A function of the ballast group is to render the compound of the invention substantially immobile and nondiffusible in the imaging media. As stated earlier, when the compounds represented by formula (I) are incorporated in the photographic image-recording elements of the invention, it is necessary that the unsubstituted or substituted 5- or 6-membered heterocyclic ring system undergo ring-opening during photographic processing, and since Y is attached to the nitrogen atom of the ring system, any group, e.g., ballast group, which would not interfere with ring-opening is preferred. Groups which would cause such interference are, for example, a sulfonyl group or an acyl group.

As mentioned previously, according to formula (I), a ballast group may be attached to at least one of the carbon atoms represented by Z. Any suitable ballast group known in the art, for example, as disclosed in U.S. Pat. Nos. 5,320,929; 5,340,689; and 5,415,970, and including those ballast groups described previously for Y, may be used. In a preferred embodiment represented by formula (IV), when Y is not a ballast group, e.g., Y is methyl or ethyl, and Z is represented by $R_1$, $R_2$, $R_3$ or $R_4$, at least one of $R_1$, $R_2$, $R_3$ or $R_4$ is a ballast group as described above.

The selection of a particular ballast group, if any, will depend on a number of factors, e.g., on the particular imaging system in which the compounds are to be used, e.g., a thiazolidine, and whether it is desired to employ only one ballast group or to employ more than one group capable of insolubilizing or immobilizing the compound. Where only one group is utilized for ballasting, it is preferable to employ, for example, a higher alkyl radical, such as decyl, dodecyl, lauryl, stearyl, and oleyl; —N-(alkyl)$_2$ when $R_1$, $R_2$, $R_3$ or $R_4$ is a ballast group; or a carbocyclic or heterocyclic ring having 6 members. Where cyclic ballast groups are used, the carbocyclic or heterocyclic ballast group may be bonded to a single atom or to adjacent atoms of the parent molecule and may be bonded to a single atom by a valence bond or through a spiro union. The ballast group(s) used in the present invention may be prepared by standard techniques known in the art.

In addition, any suitable polymeric residue may also be used as a ballast group. For example, in a preferred embodiment the ballast is a polymeric residue represented by formula (VII)

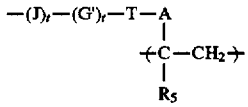

(VII)

wherein:

$R_5$ represents hydrogen or alkyl having from 1 to 6 carbon atoms;

A and G, the same or different, each represent a divalent linking group selected from the group consisting of

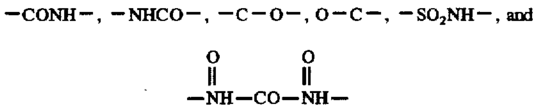

T and J, the same or different, each represent a divalent hydrocarbon group containing at least two carbon atoms; and t is 0 or 1. Compound (xvi) exemplifies a preferred embodiment wherein the ballast group is a polymeric residue. The polymeric dye-providing materials of the present invention preferably have a weight average molecular weight ($M_w$) of at least 10,000.

As previously described, the dye-providing compounds of the invention may include two or more cyclic 1,3-sulfur-nitrogen moieties. Besides undergoing cleavage in the presence of an imagewise distribution of silver ions and/or soluble silver complex, these additional cyclic 1,3-sulfur-nitrogen moieties may decrease diffusion of the uncleaved parent compound to the receptive layer of the film unit while increasing the image-forming efficiency of the reagents, for example, by releasing more dye-providing moieties per molecule of uncleaved color-providing material.

The compounds of the present invention can be prepared using reactions which are known in the art and these will be apparent particularly in view of the specific examples provided herein. Illustrative examples of the color-providing compounds within the scope of the present invention are represented by the formulae below:

(i)
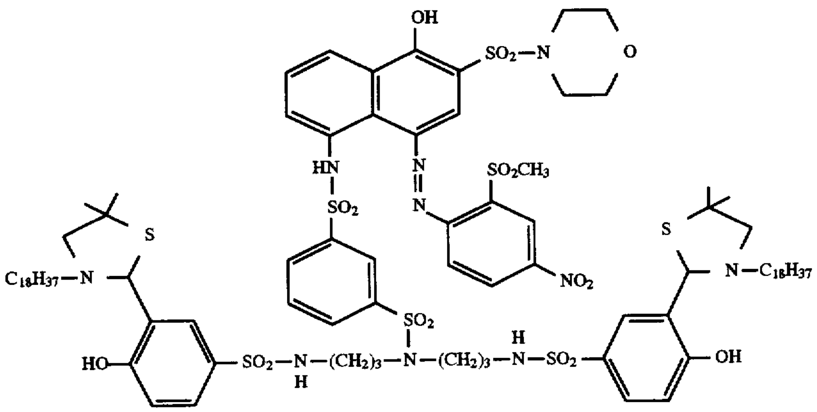
(ii)
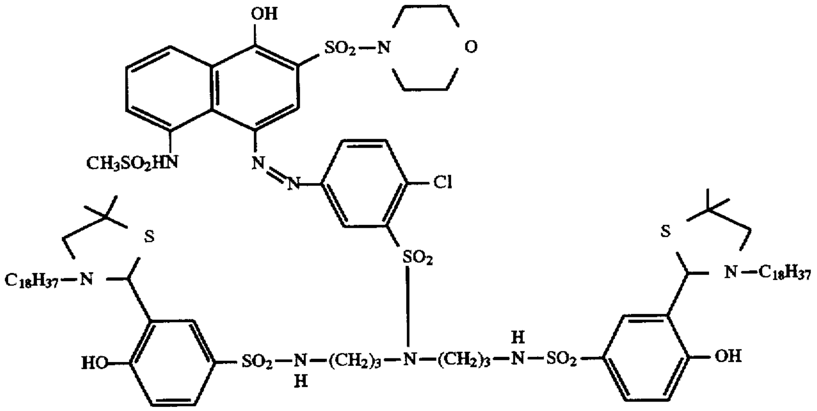
(iii)
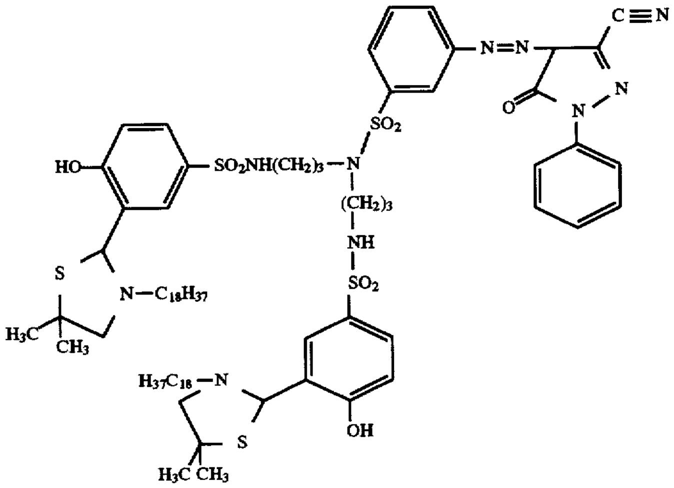

-continued
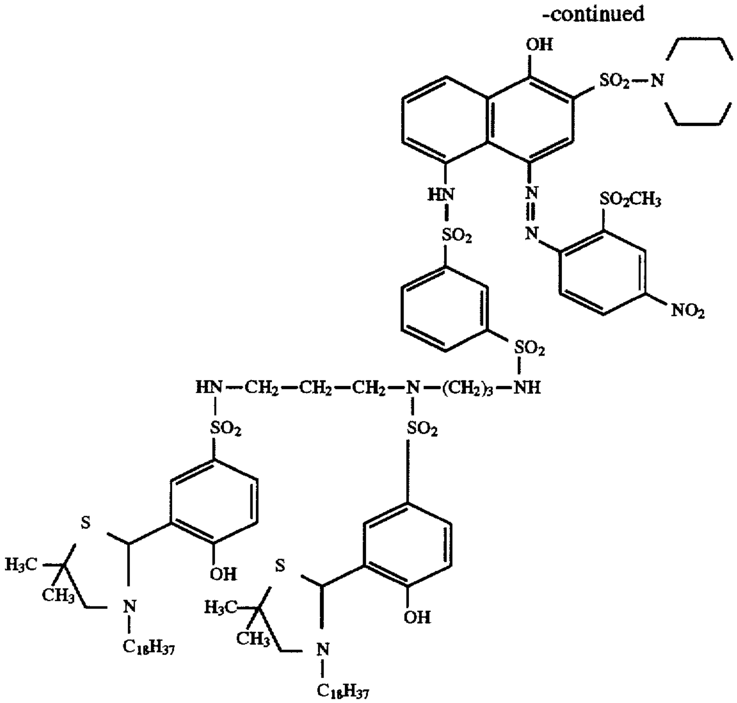
(iv)
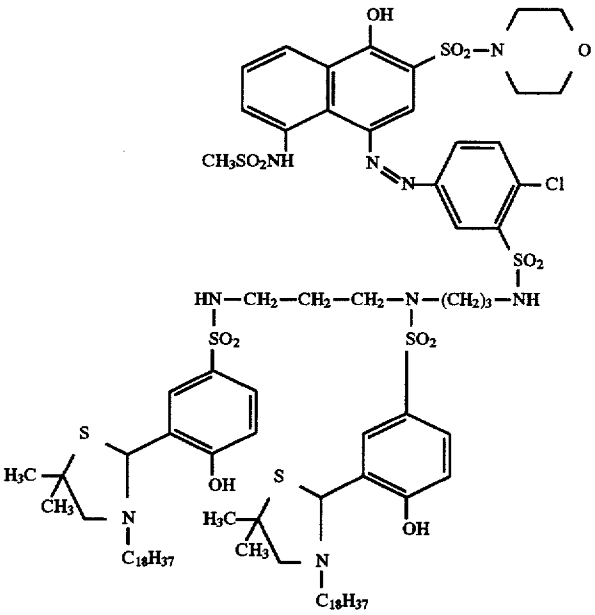
(v)

-continued
(vi)
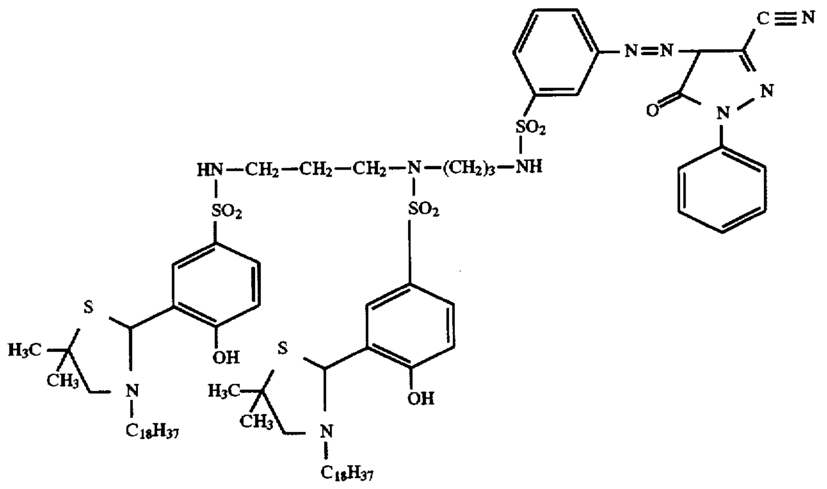
(vii)
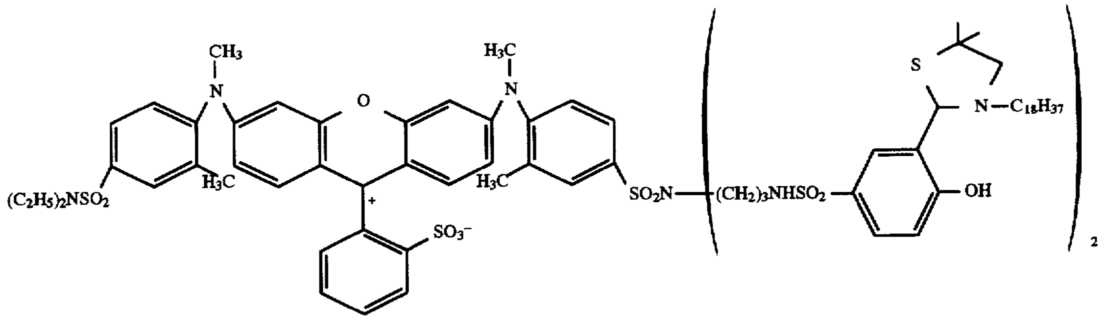
(viii)
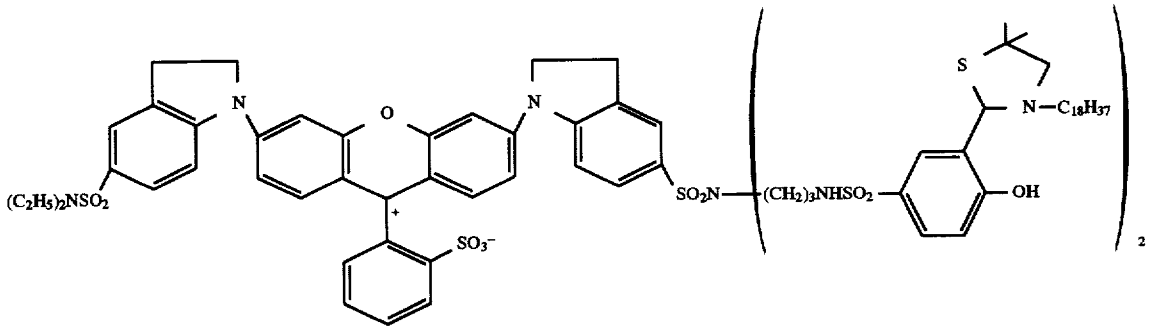

-continued
(ix)
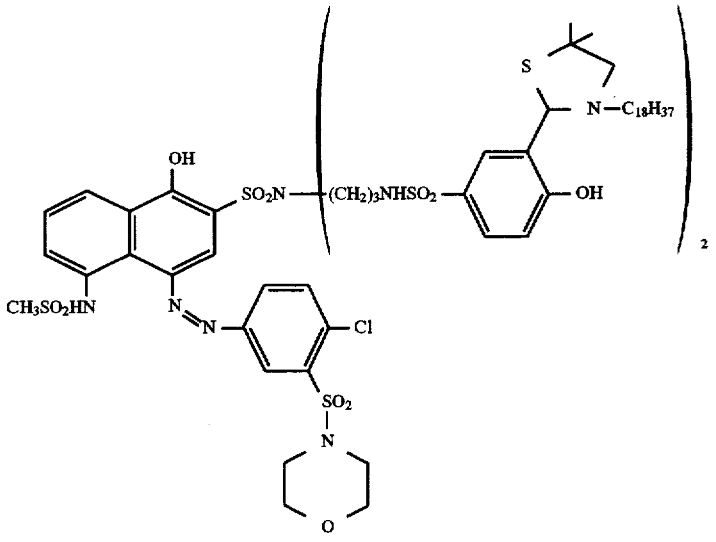
(x)
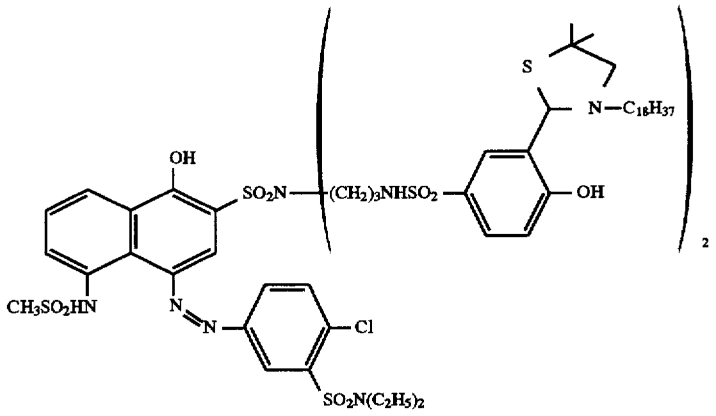
(xi)
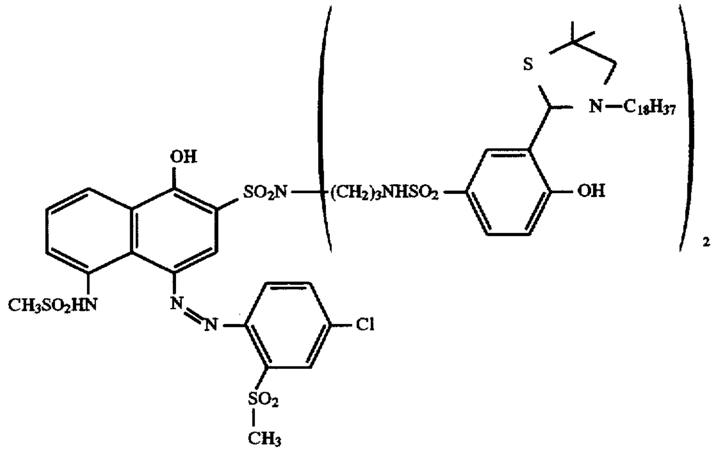

-continued
(xii)
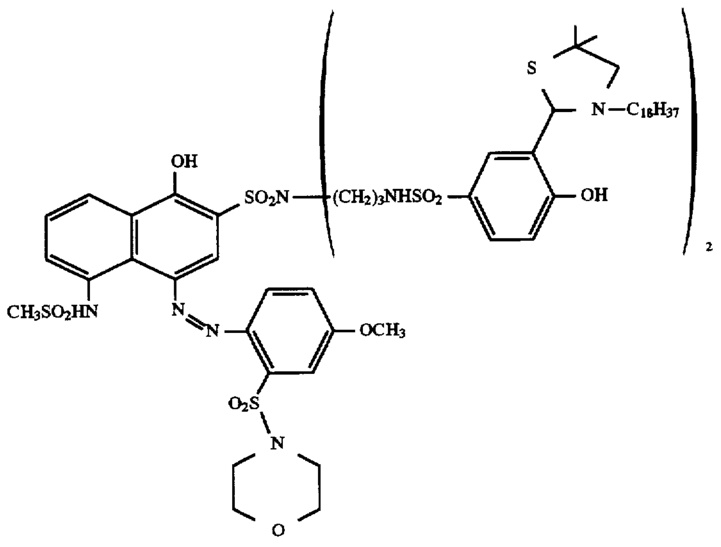
(xiii)
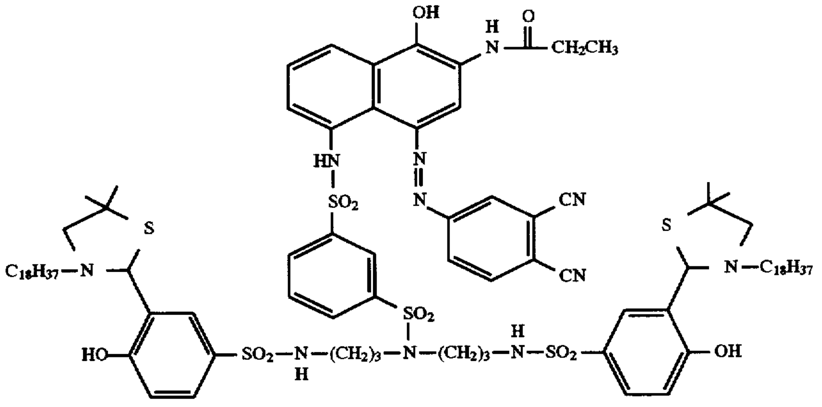
(xiv)
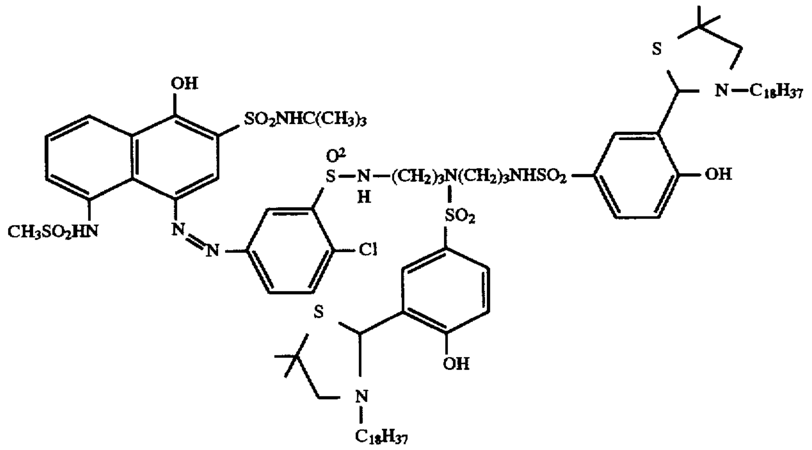

-continued
(xv)
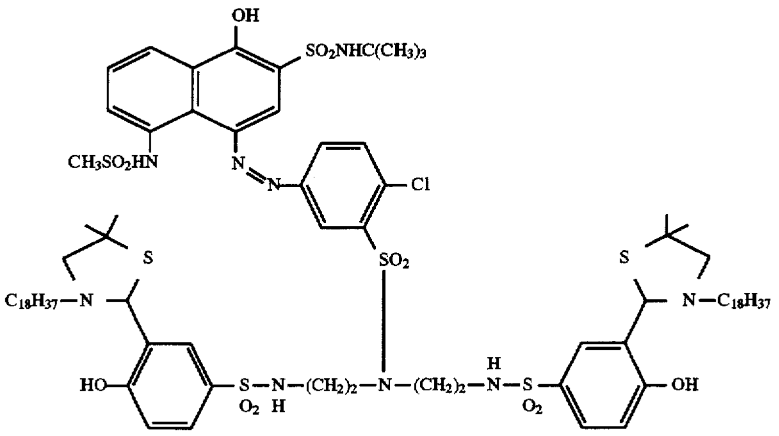
(xvi)
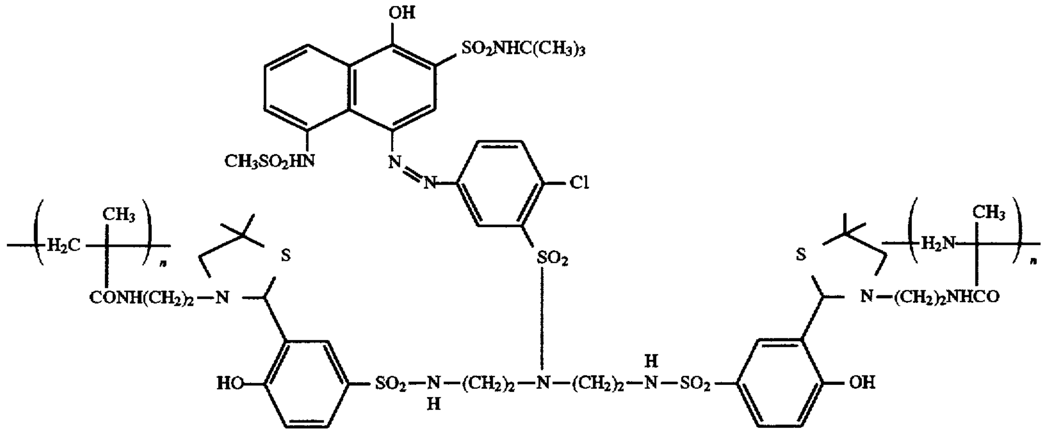
wherein n is an integer from 10 to 100.
(xvii)
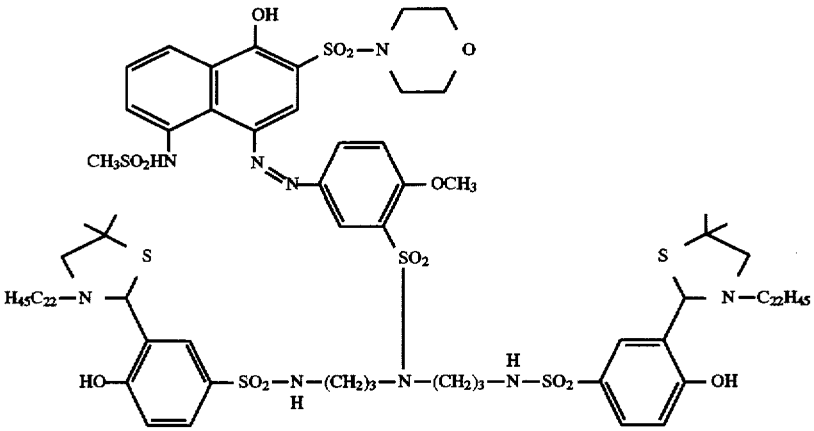

-continued
(xviii)
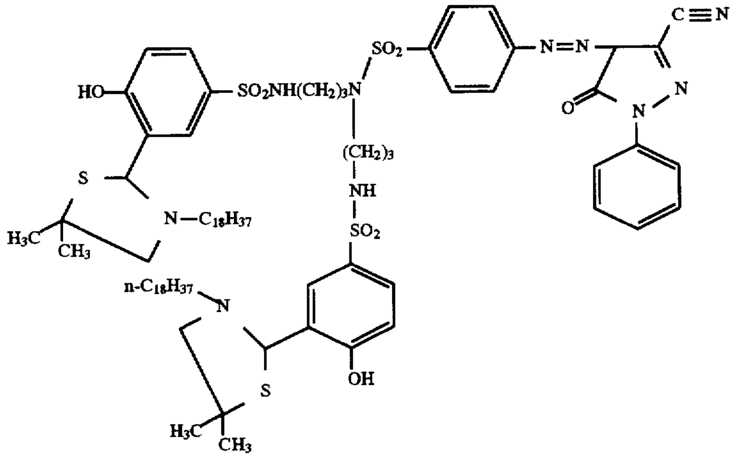
(xix)
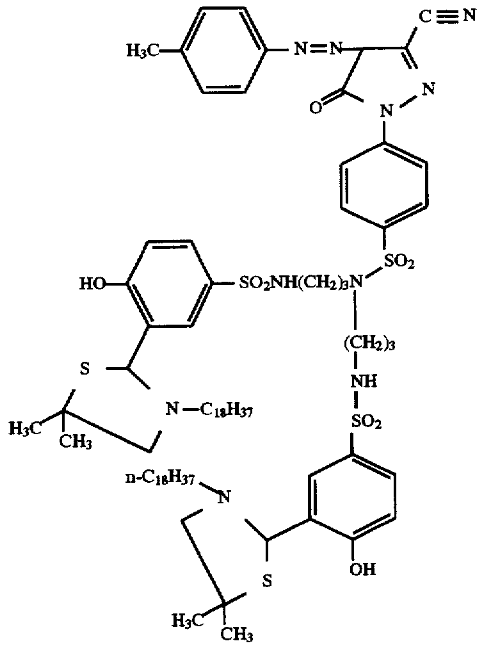
(xx)
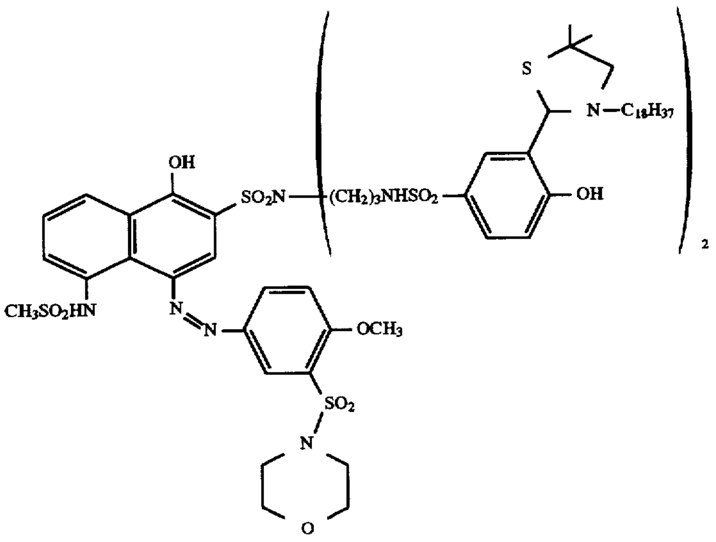

-continued

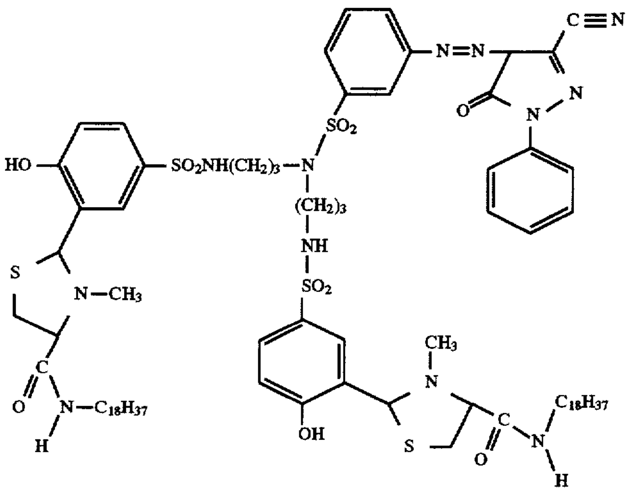

(xxi)

As noted earlier, the color-providing compounds according to the present invention are useful for forming color images in photographic, photothermographic and thermographic color imaging systems such as diffusion transfer processes. The color-providing compounds may be used in any suitable image-recording element to form a color image by transferring complete dyes or dye precursors to an image-receiving layer as a function of imagewise heating or exposure, in the presence or absence of water. Image-recording elements useful in color photographic imaging systems are well known in the art and, therefore, extensive discussion of such materials is not necessary. However, the color-providing compounds of the present invention may also be used in the novel image-recording elements disclosed and claimed in copending, commonly-assigned application Ser. No. 08/753,180 filed on even date herewith which is a continuation-in-part of prior co-pending application Ser. No. 08/607,680 filed Feb. 26, 1996, which contain a novel alkali-generating system.

Color photographic image-recording elements can be prepared in accordance with those procedures known in the art, as well as those methods described herein. In addition, the color photothermographic image-recording elements using the color-providing compounds of this invention can be prepared in accordance with such procedures as described in Research Disclosure No. 17029, issued June 1978. Further, the thermographic image-recording elements using the color-providing compounds of this invention can be prepared as described in U.S. Pat. Nos. 5,328,799 and 5,436,108.

Specifically, the color-providing compounds of the present invention may be used in color image-recording elements which typically include:

(a) one or more supports and carried by a support: a source of silver ions, a photosensitive silver halide which may act as a source of silver ions, and an image dye-providing material, e.g., a color-providing compound represented by formula (I) herein, in association with the photosensitive silver halide, which is capable of, e.g., releasing a diffusible complete dye or dye intermediate upon cleavage in the presence of silver ions, and (b) on the same or a separate support, an image-receiving layer capable of, e.g., receiving an image dye-forming compound, e.g., the diffusible complete dye or dye intermediate released from the image dye-providing compound, made available as a result of photographic development. In addition, these systems usually include a reducing agent for silver ion and may include silver salt oxidizing materials and/or an auxiliary ligand (s), e.g., methylthiomethyluracil, for silver.

For thermographic applications, the color photosensitive image-recording material generally includes a silver salt oxidizing material which may function as the sole silver ion source or as an additional source when a photosensitive silver halide is present.

As mentioned above, the color-providing compound, i.e., dye-providing compound, of the invention may be added in the same layer as the photosensitive silver halide/silver salt oxidizer emulsion layer or in a layer on either side of the photosensitive emulsion layer. However, it is generally preferred that the color-providing compound be placed so that exposure does not occur through the dye because the dye may absorb the light needed to expose the silver halide. Additionally, in certain instances, it may be desirable to separate the compound from the emulsion layer by a spacer layer. Also, where the particular color-providing compound chosen tends to be migratory during storage and/or thermal development of the heat-developable photosensitive system, it is preferred that the compound be in a separate layer and more preferably, that it be in a layer furthest from the image-receiving layer.

The amount of color-providing compound used varies with the type chosen but generally an amount of 0.25 to 2.0 $mmol/m^2$ is used. Furthermore, the color-providing compounds of the invention may be incorporated into the photographic layer(s) of the heat-developable photosensitive system by any suitable method. For example, the color-providing compounds can be dissolved in a low boiling and/or high boiling solvent and dispersed in the binder, they can be dispersed in aqueous solutions of suitable polymers, e.g., gelatin, by means of a ball mill, or they can be solvent coated using any organic solvent that will also dissolve gelatin, e.g., trifluoroethanol or dimethylsulfoxide.

It is well known in the art that in conventional photographic systems, a light-sensitive photographic element containing a photosensitive silver halide emulsion layer is exposed to form a latent image, then the exposed silver halide is developed to a visible silver image by a developer solution, typically contained within a rupturable container. Such a developer is generally an aqueous alkaline processing composition and, in general, developer activity increases as the amount of alkali in the developer is increased.

However, as stated earlier, it is also well known in the art that the alkaline environment required for silver image development may be generated in situ in the manner described in U.S. Pat. Nos. 3,260,598; 4,740,363; and 4,740,445; and, in copending, commonly-assigned application Ser. No. 08/753,180 filed on even date herewith which is a continuation-in-part of prior copending application Ser. No. 08/607,680 filed Feb. 26, 1996. By way of illustration, example IV herein shows the use of the color-providing compounds of the present invention in a heat-developable photosensitive multi-color image-recording element which has an alkali-generating system incorporated therein, as disclosed and claimed in copending, commonly-assigned application Ser. No. 08/753,180 filed on even date herewith which is a continuation-in-part of prior copending application Ser. No. 08/607,680 filed Feb. 26, 1996. More specifically, in the alkali-generating system of example IV herein, a slightly water-soluble metal compound, i.e., zinc oxide, is reacted with a ligand, i.e., a sodium salt of 2-hydroxy-pyridine-N-oxide, in the presence of a fluid, i.e., water, wherein the photographically-acceptable cation of the ligand, i.e., sodium, coordinates the metal ion, i.e., zinc, from the slightly water-soluble metal compound and, in turn, alkali is formed. The generation of the base increases the pH of the system by generally 2 to 3 pH units, thus providing the alkaline environment required for effective development of the photosensitive silver halide.

The color-providing compounds of the present invention may be used in image-recording materials which are developed using alkali contained within either an aqueous alkaline processing composition distributed to the materials after exposure such as from a rupturable container or generated in situ as mentioned above. Furthermore, the image-recording material of the present invention which is developed using an aqueous alkaline processing composition further comprises means for applying a photographic processing composition typically comprising an aqueous alkaline solution of silver halide developing agent and a silver halide solvent.

As stated earlier, the color-providing compounds of the present invention may be used as the image dye-releasing thiazolidines in subtractive color transfer films which utilize image dye-releasing thiazolidines as the imaging mechanism. Accordingly, the color-providing compounds of the present invention are substantially non-diffusible in the thermographic, photothermographic and photographic elements but are capable of undergoing cleavage in the presence of the imagewise distribution of silver ions and/or soluble silver salt complex made available in the undeveloped and partially developed areas as a function of development to liberate a more mobile and diffusible dye or dye intermediate in a corresponding imagewise distribution.

For forming color images in photographic image-recording systems, a color-providing compound according to an embodiment of the present invention can be used in both monochrome and full-color imaging systems such as disclosed in U.S. Pat. Nos. 4,098,783 and 3,719,489. Generally, in these systems, a color-providing compound, e.g., a complete dye or dye intermediate, is associated with a light-sensitive silver halide emulsion which, after being exposed, is developed with an aqueous alkaline processing solution, generally released from a rupturable container, which includes a silver halide developing agent and a silver halide solvent. The imagewise distribution of silver ions such as contained in the soluble silver complex made available during processing of the emulsion migrates to the associated color-providing material which undergoes cleavage in the presence of the complex to release an imagewise distribution of the more diffusible reagent, e.g., a complete dye or dye intermediate. The subsequent formation of a color image is the result of the differential in diffusibility between the color-providing compound and the liberated complete dye or dye intermediate whereby the imagewise distribution of the more diffusible complete dye or dye intermediate released in undeveloped and partially developed areas is free to transfer to the image-receiving layer. As indicated earlier, the color photographic image-recording elements using the compounds of this invention can be prepared in accordance with such procedures as described in U.S. Pat. Nos. 4,098,783 and 3,719,489, the disclosures of both being herein incorporated by reference.

As stated above, the color-providing compounds of the present invention may be used in photosensitive image-recording elements to form monochrome, e.g., see example V herein, or multi-color, e.g., see example IV herein, images. If the photosensitive image-recording material is to be used to generate a full-color image, it generally has three different light-sensitive layers each releasing a different color dye as a result of development.

For the thermographic image-recording materials, full-color images may be obtained by using the three subtractive primaries: yellow, magenta and cyan. This may be achieved, e.g., by employing three separate thermosensitive sheets, each designed to release a different diffusible dye as a result of thermal development. The image to be reproduced is generally separated into its blue, green and red components and each color record is printed in registration, using the corresponding thermosensitive sheet, on the same receiving sheet in a manner analogous to that used in conventional dye diffusion thermal transfer processes, such as described, for example, in Advanced Printing of Conference Summaries, SPSE's 43rd Annual Conference, May 20–25, 1990, pp. 266–268, SPSE, Springfield, Va., D. J. Harrison, *Thermal Dye Transfer Hard Copy Chemistry and Technology*, Eastman Kodak Company, Rochester, N.Y.

Where multi-color images are desired, one or more layers containing a scavenger for silver ion and/or soluble silver complex may be employed between the photosensitive emulsion layers to enhance color separation. By virtue of the silver scavenger layer(s) being positioned between the emulsion layers, the migration of the imagewise distribution of soluble silver ions or soluble silver complex formed during processing of each emulsion layer is confined to the area of the compound associated with each emulsion layer and prevented from diffusing into the area of the compound associated with the other emulsion layer or layers. Silver scavengers which may be employed in the present invention include those described in U.S. Pat. No. 4,060,417.

The source of silver ions may be any of those materials commonly employed in the photographic art to provide silver ions provided the silver ion is made available imagewise upon processing to cleave the cyclic 1,3-sulfur-nitrogen moiety(ies) of the compound and release the diffusible reagent, i.e., complete dye or dye intermediate. Useful materials include silver halides and any of the silver salt oxidizing materials known in the art, such as those described in Research Disclosure No. 17029. The silver salt oxidizing material is generally an organic silver salt or silver salt complex as is known in the art such as described in U.S. Pat. Nos. 4,260,677; 4,729,942; 5,320,929; and 5,436,108.

The photosensitive silver halide used in the present invention may be any photosensitive silver halide employed in the photographic art, such as, silver chloride, iodide, bromide, iodobromide, chlorobromide, etc., and it may be prepared in situ or ex situ by any known method including using a light-sensitive silver halide-forming component in the presence of the silver salt oxidizing material so as to form the light-sensitive silver halide in part of the silver salt oxidizer.

The silver salt oxidizer used in embodiments of the present invention can be prepared in a suitable binder by any known means and then used immediately without being isolated. Alternatively, the silver salt oxidizer may be isolated and then dispersed in a suitable binder. The silver salt oxidizer is generally used in an amount ranging from 0.5 to 12.0 mmol/$m^2$, and preferably from 0.5 to 4.0 mmol/$m^2$.

The photosensitive silver halide emulsions are typically aqueous silver halide emulsions, and any conventional silver halide precipitation methods may be employed in the preparation of the emulsions. The photosensitive silver halide emulsions may be spectrally sensitized by any suitable spectral sensitization method in order to extend the photographic sensitivity to wavelengths other than those absorbed by the unsensitized silver halide. Examples of suitable sensitizing materials include cyanine dyes, merocyanine, styryl dyes, hemicyanine dyes and oxonole dyes. In addition to spectral sensitization, the silver halide emulsions may be chemically sensitized using any suitable chemical sensitization technique. Many chemical sensitization methods are known in the art. The silver halide emulsion is generally added to each photosensitive layer in an amount calculated to give a coated coverage in the range of 0.5 to 8.0 mmol/$m^2$, preferably 0.5 to 4.0 mmol/$m^2$.

Any suitable reducing agents may be used in the photographic, photothermographic, and thermographic image-recording elements of the present invention. The silver halide developing agent may be selected from those commonly employed, such as inorganic reducing agents, e.g., sodium sulfite and sodium hydrogen sulfite; hydroxylamines; hydrazines; hydrazides; boran-amine complexes; the diaminobenzenes, e.g., paraphenylenediamine; aminophenols, e.g., methyl-p-aminophenol; and dihydroxybenzenes, e.g., hydroquinone.

Reducing agents which may be used in the heat-developable photographic materials of the invention may be selected from among those commonly used in heat-developable photographic materials. Illustrative reducing agents useful in the present invention include hydroquinone and its derivatives, e.g., 2-chloro-hydroquinone; aminophenol derivatives, e.g., 4-aminophenol and 3,5-dibromophenol; catechol and its derivatives, e.g., 3-methoxycatechol; phenylenediamine derivatives, e.g., N,N-diethyl-p-phenylenediamine; and, 3-pyrazolidone derivatives, e.g., 1-phenyl-3-pyrazolidone and 4-hydroxymethyl-4-methyl-1-phenyl-3-pyrazolidone; 3-pyrazolidinones; hydroxy-tetronic acids; ascorbic acids; and, 4-amino-5-pyrazolones. Preferred reducing agents include: 1-phenyl-3-pyrazolidone, commercially available under the tradename Phenidone, and 4-hydroxymethyl-4-methyl-1-phenyl-3-pyrazolidone, commercially available under the tradename Dimezone-S. Reductone developer agents such as aminoreductone may also be used in the heat-developable photosensitive image-recording elements of the present invention. see U.S Pat. No. 5,427,905; and, for use in photothermographic elements, U.S. Pat. Nos. 4,433,037; 4,550,071; and 4,639,407.

The reducing agents may be used singly or in combination and they are generally employed in amounts ranging from 0.5 to 10.0 mmol/$m^2$, and preferably 1.0 to 8.0 mmol/$m^2$.

Reducing agent precursors which do not have a reducing property by themselves but may express a reducing capacity with the aid of a nucleating reagent or under heat during the step of development may also be employed. Examples of reducing agent precursors which may be employed in the present invention are described in U.S. Pat. Nos. 5,336,761 and 4,500,626.

For photothermographic diffusion transfer image-recording materials and thermographic applications, the image-recording elements of the present invention may additionally contain a thermal solvent(s). The thermal solvent(s) may be incorporated in one or more layers in the photosensitive and/or image-receiving elements. Thermal solvents which are useful in heat-developable imaging materials and methods are nonhydrolyzable, thermally-stable compounds which are solids at ambient temperature but which melt at or below the temperature used in thermal processing. The thermal solvent acts as a solvent for various components of the heat-developable photosensitive material, assists in the acceleration of thermal development, and provides the medium for diffusion of various components including silver ions and/or complexes, reducing agents and image dye materials. The amount of thermal solvent present in a single layer is typically from 0 to about 10 g/$m^2$ and preferably from about 0.1 to about 1.5 g/$m^2$.

Many suitable thermal solvents for use in heat-developable photosensitive image recording elements are known in the art such as those described in U.S. Pat. Nos. 3,347,675 and 3,667,959. Accordingly, any suitable, e.g., for use with gelatin as described in U.S. Pat. No. 5,368,979, thermal solvent may be incorporated in embodiments of the image-recording elements of the present invention. Moreover, it would be apparent to those skilled in the art that the choice of a thermal solvent(s) should be made such that its use in the image-recording material would not have any adverse effect upon the image formation process.

Further, as stated earlier, the color-providing compounds of the present invention may be used in a heat-developable image-recording element which has an alkali-generating system incorporated therein. The alkali-generating systems referred to above typically require a fluid such as water to generate the base. In embodiments of the present invention wherein the thermographic image-recording elements are processed in the absence of water, a thermal solvent, such as those described above, may act as the fluid required for alkali generation.

The photosensitive silver halide emulsion layer(s) and other layers of the heat-developable image-recording material according to embodiments of the present invention may contain various materials as binders. Suitable binders for photosensitive silver halide emulsion layers include water-soluble synthetic, high-molecular weight compounds such as polyvinyl alcohol and polyvinylpyrrolidone and synthetic or naturally-occurring high molecular weight compounds such as gelatin, gelatin derivatives, cellulose derivatives, proteins, starches and gum arabic. A single binder or mixture of binders may be used. A preferred binder material is gelatin. The amount of binder used in each layer is generally froth about 0.5 to about 5.0 g/$m^2$, preferably from about 0.5 to about 3.0 g/$m^2$.

The layers of the heat-developable photosensitive system according to embodiments of the present invention which contain a crosslinkable colloid as a binder, e.g., gelatin, can be hardened by using various organic and inorganic hardeners such as those described in T. H. James, *The Theory of the Photographic Process*, 4th Ed., MacMillan, 1977, pp. 77–87. The hardeners can be used alone or in combination. It is preferred that the image-recording elements according to the present invention contain a hardener in the photosensitive silver halide emulsion layer. Any suitable hardener known in the photographic art may be used; however, aldehyde hardeners, e.g. succinaldehyde and glyoxal, have been found to be particularly useful when gelatin is employed as the binder. The hardeners are generally used in amounts ranging from 1 to 10% by weight of the total amount of gelatin coated.

The support(s) for the heat-developable image-recording elements according to embodiments of the present invention must necessarily be able to withstand the heat required for processing the image. The support can be transparent or opaque. Any suitable support can be employed such as those described for photothermographic materials in Research Disclosure No. 17029, issued June 1978. Specific examples of suitable supports include synthetic polymeric films, such as polyethylene terephthalate, polycarbonate, polyvinyl chloride, polystyrene, polyethylene, polypropylene and polyimide. The above described supports can be made opaque by incorporating pigments therein such as titanium dioxide and calcium carbonate. Other supports include paper supports, such as photographic raw paper, printing paper, baryta paper and resin-coated paper having paper laminated with pigmented thermoplastic resins, fabrics, glass and metals. Preferably, a polyester film is used.

A subcoat may be added to the face of the support which carries the heat-developable photosensitive materials of embodiments of the present invention in order to increase adhesion. For example, a polyester base coated with a gelatin subcoat has been found to enhance adhesion of aqueous based layers.

Various polymeric materials have been utilized as mordants in photographic products and processes including those of the diffusion transfer type. The mordants used herein may be selected from a variety of mordants although polymeric mordants are preferred. Thus, polymeric mordants suited to application in diffusion transfer products and processes for the formation of photographic images in dye are described, for example, in U.S. Pat. Nos. 3,148,061; 3,758,445; 3,770,439; 3,898,088; 4,080,346; 4,308,335; 4,322,489; 4,563,411; 4,749,067; and 5,395,731. The mordant layer for use with the image-recording elements of the invention which have an alkali-generating system incorporated therein, as discussed above, preferably includes poly-4-vinylpyridine (P4VP), polyvinylalcohol (PVA), crosslinkers and a surfactant.

Additionally, the heat-developable photosensitive image-recording material of embodiments of the present invention optionally may include other materials known in the art for use in photothermographic image-recording elements. These include, but are not limited to, antifoggants such as described in U.S. Pat. No. 4,743,533, antistatic materials, coating aids e.g. surfactants, activators and the like.

It is known in the art to utilize development restrainers and development restrainer precursors in photographic applications. A predetermined level of development usually will take place before the development restrainers or development restrainer precursors function to inhibit or control further development. The blocked development restrainers are designed to provide a controlled release of the development restrainer during the development process. Such blocked development restrainers are disclosed, for example, in U.S. Pat. Nos. 3,260,597 and 3,265,498 which disclose hydrolyzable blocked restrainers; U.S. Pat. No. 3,698,898 which discloses the use of quinone- or naphthoquinonemethide precursors which release a photographic reagent such as 1-phenyl-5-mercaptotetrazole in the presence of alkali; U.S. Pat. No. 3,938,996 which discloses the use of a carbocyclic blocking group which includes an oxime group (e.g. —C=N—OH); U.S. Pat. No. 4,009,029 which discloses a class of cyanoethyl-containing blocked development restrainers; and German Offenlegungsschrift No. 2,427,813 which discloses various blocked development restrainers. In addition, U.S. Pat. No. 4,946,964 discloses and claims compounds capable of providing controlled release of development restrainers during the development process. Furthermore, as mentioned earlier, the developer itself may be blocked, i.e., reducing agent precursors which do not have a reducing property by themselves but may express a reducing capacity with the aid of a nucleating reagent or under heat during the step of development.

Development activators may also be used such as those described in U.S. Pat. Nos. 2,162,714; 3,173,786; 3,301,678; 3,669,670; 3,839,041; 3,844,788; 3,877,940; 3,893,859; 4,012,260; 4,060,420; and 4,677,206; and, in Belgian Patent No. 768,071.

Also, the photosensitive elements optionally may contain additional layers commonly used in the art, such as spacer layers, a layer of an antihalation dye, and/or a layer of a filter dye arranged between differentially color-sensitive emulsion layers. A protective layer may also be present in the image-recording material of the present invention. The protective layer may contain a variety of additives commonly employed in the photographic art. Suitable additives include matting agents, colloidal silica, slip agents, toning agents, organofluoro compounds, ultraviolet absorbers, accelerators, antioxidants, etc.

Any image-receiving layer which has the capability of receiving the complete dye or dye intermediate released as a result of thermal development may be used in the thermographic and photothermographic imaging materials of the present invention. Typical image-receiving layers which can be used are prepared by coating a support material with a suitable polymer for receiving the dye. Suitable polymers to be coated on the image-receiving support to receive the dye include polyvinyl chloride, poly(methyl methacrylate), polyester and polycarbonate. Preferably, a combination of polyvinyl alcohol and poly-4-vinyl-pyridine is used. Alternatively, certain polymers may be used as both the support and the dye-receiving material.

In the thermographic and photothermographic imaging materials of the present invention, the image-receiving layer may be superposed on the photosensitive element after exposure and the two heated simultaneously to develop the image and cause, in this embodiment, the dye to transfer. Alternatively, in another embodiment, the negative may be exposed and then processed with heat, followed by superposing the image-receiving sheet on the exposed and developed photosensitive material and applying heat and pressure to transfer the dye. After heat-development, the two layers may be retained together as a single element or they can be peeled apart from one another.

In addition, thermographic and photothermographic processed photographic systems may be processed in the presence of a base or a base-precursor. It is known in the art that the base or base-precursor may be either added to the system or generated internally by reactions of compounds incorporated in photographic systems. It is also known in the art that thermographic and photothermographic processed photographic systems may be processed in the absence of a base or a base-precursor, for example, the color-providing moiety transfers due to the hydrophobicity of the polymer such as polyvinylchloride which is coated on the image-receiving support, as described above, to receive the color-providing moiety.

As mentioned above, film products comprising sheets that are separated after processing are described as "peel-apart" films. In integral films, the sheets, together with a rupturable container which contains an aqueous alkaline processing composition such as described in U.S. Pat. No. 3,719,489, or an alkali-generating system such as disclosed and claimed in copending, commonly-assigned application Ser. No. 08/753,180 filed on even date herewith which is a continuation-in-part of prior copending application Ser. No. 08/607,680 filed Feb. 26, 1996, are retained as sealed film units, providing images that are ready for viewing without separation of the two sheets.

One integral color print film structure comprises a multilayer negative sheet and a positive sheet preassembled with a rupturable container or an alkali-generating system and sealed together at the edges, as described in U.S. Pat. No. 3,415,644. In these film units, exposure and viewing of the image take place through the same surface.

An alternative integral film configuration provides both emulsion and receiving layers as coatings on the same support, in combination with the spreader sheet. This film unit is exposed through one surface and the image is viewed through the opposite surface, as described in U.S. Pat. Nos. 3,594,165 and 3,689,262; Belgian patent No. 757,960; and Hanson, W. T., Jr. 1976, "A Fundamentally New Imaging Technology for Instant Photography," *Photogr. Sci. Eng.*, 20, 155–160.

Embodiments of the present invention include the alternative film configurations described above. For example, the color-providing compounds of the present invention may be used in image-recording elements wherein the photosensitive silver halide emulsion layer(s) and the image-receiving layer are initially contained in separate elements which are brought into superposition subsequent or prior to exposure. After development the two layers may be retained together in a single element, i.e., an integral negative-positive film unit or they can be peeled apart from one another. Where the photosensitive silver halide emulsion layer(s) and the image-receiving layer are retained together as an integral negative-positive film unit, a masking layer, e.g., titanium dioxide, is necessary to conceal the untransferred dye from the final image.

Alternatively, rather than being in separate elements, as described above, the photosensitive layer(s) and the image-receiving layer of the image-recording materials containing the color-providing compounds of the present invention may initially be in a single element wherein the negative and positive components are contained in a heat-developable photosensitive laminate, as described above, or otherwise retained together in an integral structure.

The photosensitive image-recording material containing the dye-providing compounds of the present invention may be exposed by any of the methods used in the photographic art, e.g., a tungsten lamp, a mercury vapor lamp, a halogen lamp, fluorescent light, a xenon flash lamp or a light emitting diode including those which emit infrared radiation.

In certain embodiments of the present invention, photosensitive image-recording elements containing the dye-providing compounds of the invention are heat-developed after imagewise exposure. This is generally accomplished by heating the material at a temperature in the range of from about 80° to 160° C., preferably in the range of from about 100° to 120° C., for a period of from about 1 to 720 seconds, preferably from about 1.5 to 180 seconds. The preferred temperature range is 80° to 120° C. for embodiments in which the image-recording material has an alkali-generating system incorporated therein. Heat may be used alone or heat may be applied simultaneously with pressure, if necessary, to create good thermal contact between the photosensitive and image-receiving elements. Pressure can be applied simultaneously with the heat required for thermal development by using heated rollers or heated plates. Alternatively, heat and, if required, pressure can be applied subsequent to thermal development in order to transfer the released reagent.

Any method of heating that can be employed in heat-developable photosensitive systems may be applied to the heat-developable image-recording elements of the present invention. Thus, for example, heating may be accomplished by using a hot plate, an iron such as a waffle iron, heated rollers or a hot drum.

In embodiments of the image-forming system of the present invention, water is used as a reaction medium. Water may be available by any suitable means, for example, by supplying water from without the system, or by previously incorporating water-containing capsules or similar means in the system and breaking the capsules by heating or the like to release the water. In addition, a water-releasing compound may be used which releases water by decomposition during heat development, such as described in U.S. Pat. No. 4,550,071.

The invention will now be described further in detail with respect to specific preferred embodiments by way of examples, it being understood that these are intended to be illustrative only, and the invention is not limited to the materials, procedures, amounts, etc. recited therein. All parts and percentages recited are by weight unless otherwise stated.

EXAMPLE I

Preparation of the Azo Yellow Dye

The following compounds were used in the preparation of the Azo Yellow Dye:

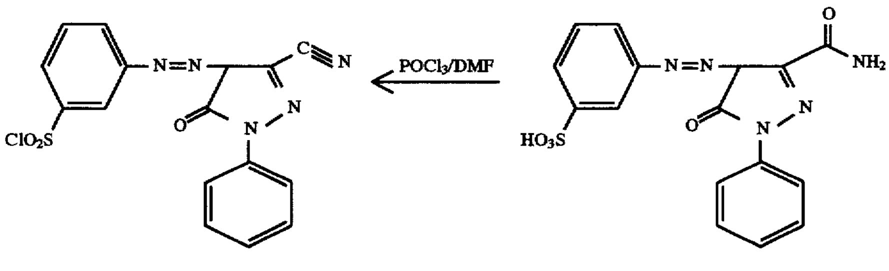

Compound A

-continued

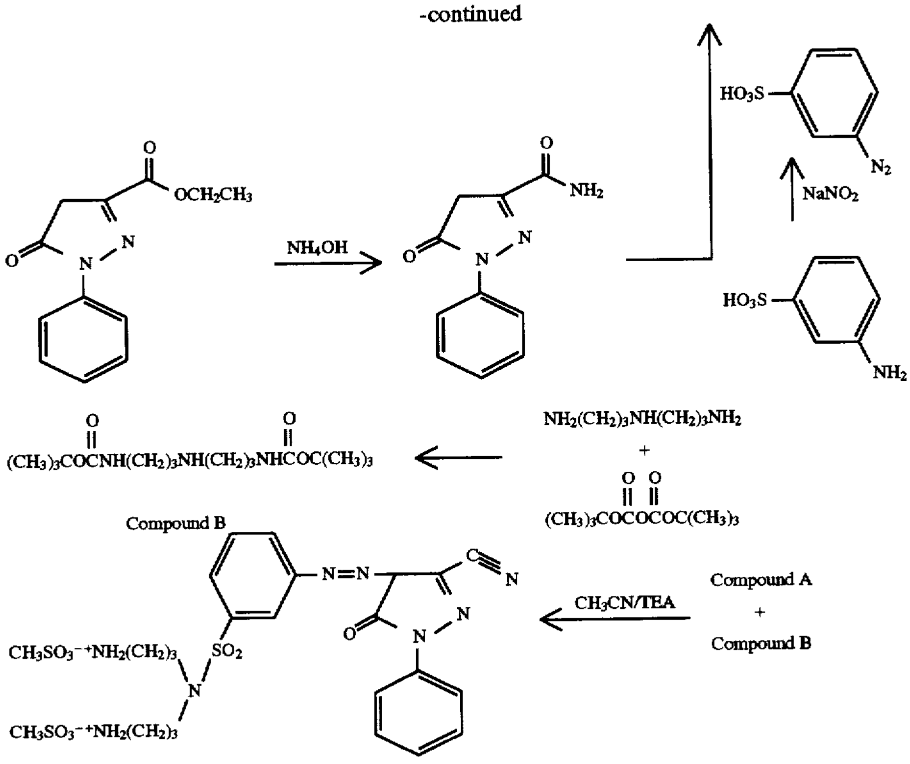

Compound B

Compound C

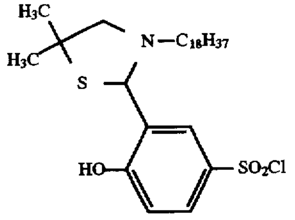

Compound D

To a mechanically-stirred solution of Compound A (21 g, 54 mmol) dissolved in THF (500 ml), was added the protected triamine, Compound B (19.8 g, 60 mmol), and dropwise over 2 minutes, N,N-diisopropylethylamine (21 ml, 119 mmol). After 3 hours at 25° C., the reaction had gone to completion and was further diluted with THF (250 ml) and cooled to 0° C. Methanesulfonic acid (53 ml, 810 mmol) was added dropwise over 10 minutes and the reaction was warmed to 25° C. over one hour and then gently refluxed for 3 hours at which time starting material had been completely consumed and a yellow precipitate had formed. The reaction mixture was cooled to 25° C., diluted with hexanes (750 ml) and the solids were collected by suction filtration. The solids were washed with acetone (4×150 ml) and dried in air to give the bis-methanesulfonate salt, Compound C, as a yellow solid (94% area).

Next, Compound C was added to a mixture of saturated $K_2CO_3$ (250 ml) and THF (250 ml) and stirred for one hour. The THF layer was separated and the aqueous phase was extracted with THF (2×50 ml). The combined THF extracts were dried over $K_2CO_3$, filtered, and concentrated in vacuo. Residual water was removed by dissolving the residue in 1:1 toluene/ethanol (2×200 ml) and concentrated in vacuo. The residue was suspended/dissolved in THF (500 ml) and TSC, Compound D (64 g, 108 mmol), was added. After 20 minutes, N,N-diisopropylethylamine (38 ml, 216 mmol) was added dropwise and the reaction mixture was stirred overnight at 25° C. The reaction mixture was concentrated in vacuo and the residue was dissolved in ethyl acetate (500 ml) and extracted with 1N HCl (2×100 ml) and $NaHCO_3$ (2×100 ml). The aqueous phases were back extracted with ethyl acetate (1×50 ml) and the combined organics were dried over anhydrous $MgSO_4$, filtered, and concentrated in vacuo. The residue (74% area) was purified by preparative L.C. (3×4:1 hexanes/THF to 1:1 hexanes/THF, 60 minute gradient) to give 34 g of the CPM (Compound (iii)) as a yellow glass. (41% yield from the sulfonyl chloride, Compound A). HPLC analysis showed 96% (area) purity of the CPM: the $\lambda_{max}$ DMSO was 456, with an $\epsilon$ of 19,800.

EXAMPLE II

Preparation of the Azo Cyan Dye

Some of the compounds of example I along with the following compounds were used in the preparation of the Azo Cyan Dye:

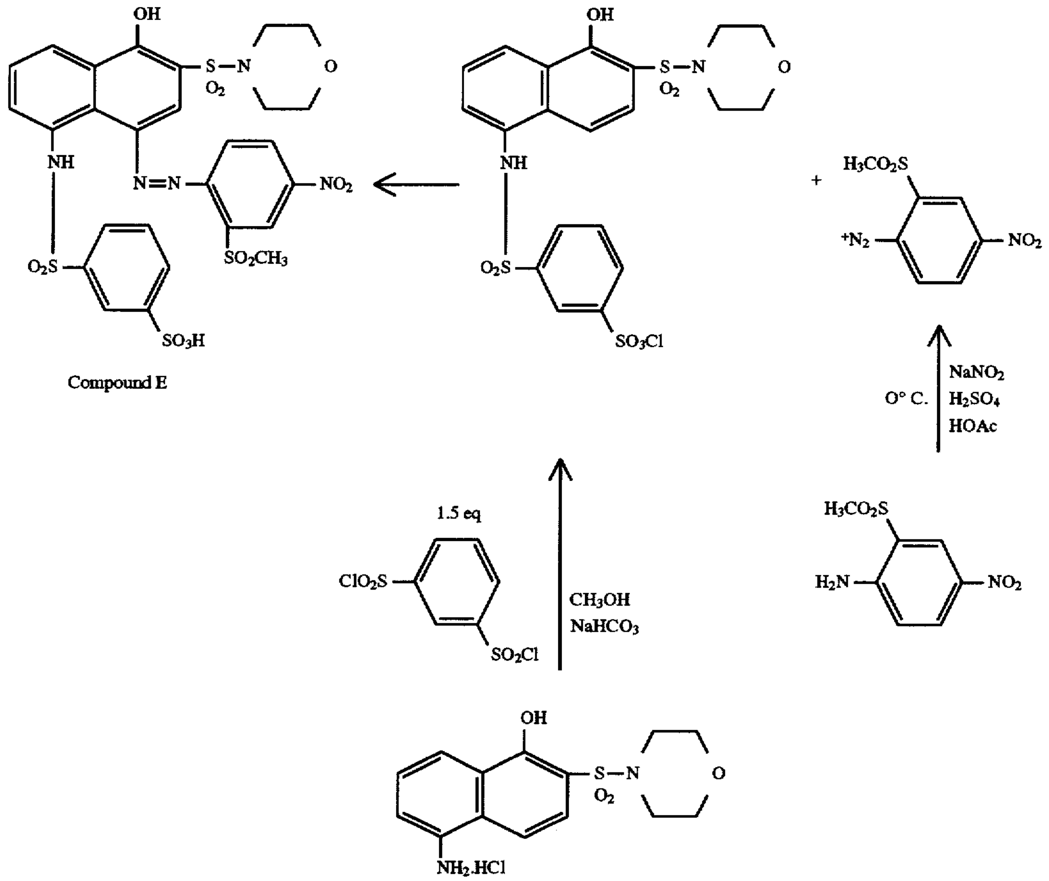
Compound E
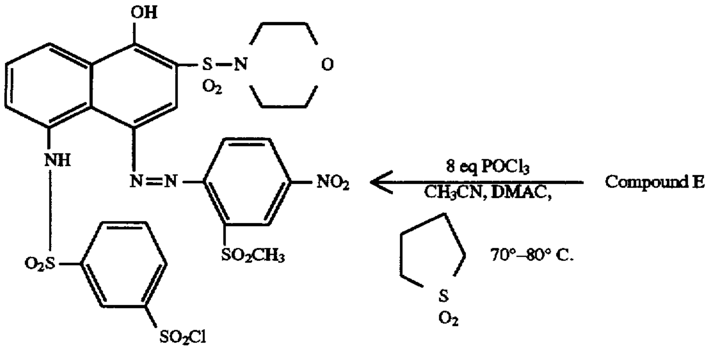
Compound F
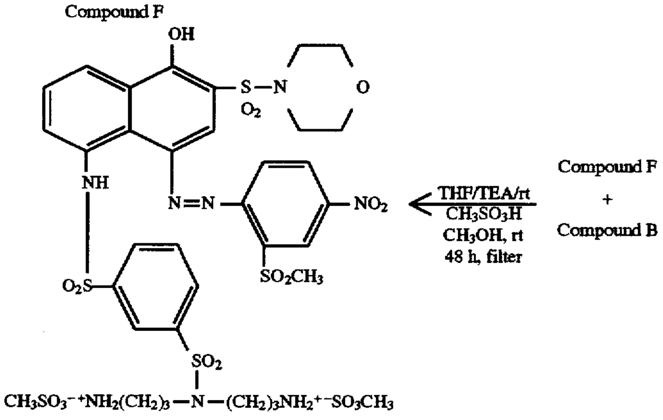
Compound G

Acetonitrile (2.0 L), sulfolane (300 ml), and N,N-dimethylacetamide (250 ml) were added to cyan sulfonic acid, Compound E (600 g; 0.79 moles), and stirred to obtain a thin, brown-blue slurry. $POCl_3$ (400 ml) was added slowly. The temperature increased to about 50° C. forming a thick, orange slurry. The slurry was stirred vigorously, heated to 70°–80° C., at which temperature it was maintained for 2½ hours. The slurry was cooled, diluted with toluene (1 L) and let stand overnight at room temperature. Next, the slurry was further diluted with additional toluene (2.2 L), filtered, washed with toluene and dried under vacuum at 65°–75° C. (yield: 583 g of Compound F).

Next, a 12 L flask equipped with an overhead stirrer was charged with Compound F (465 g, 0.6 mol) and anhydrous THF (5 L). The bis tBOC triamine, Compound B (220 g, 0.66 mol), was added as a solid, all at once to the slurry, followed by the addition of TEA (84 ml, 0.61 mol). After one hour, a second equivalent of TEA (84 ml) was added. The reaction was then stirred overnight at room temperature. The reaction was cooled on ice to 21° C. Methane sulfonic acid (700 ml) was added neat over a time period of 20–30 minutes, increasing the temperature of the reaction to 29° C. (an orange precipitate forming after 200/700 ml). When the temperature cooled to 25° C., the ice bath was removed and the reaction was stirred at room temperature for 48 hours. The orange mixture was then filtered. The solids were washed with THF (1 L) and acetone (2 L), pressed dry using a rubber dam, slurried in hexane (2 L), filtered and allowed to air dry overnight. (yield: 697 g of Compound G).

Next, Compound G (697 g, 0.6 mol) was placed in a 12 L flask equipped with an overhead stirrer. Then, methylene chloride (3 L) was added to form a suspension. Thereupon, a total volume of 418 ml of TEA (3.0 mol) was added to the suspension as follows: first, 300 ml was added which turned the suspension a deep blue color as the free diamine went into solution; then, TSC (730 g, 1.3 mol, dissolved in 2 L of methylene chloride) was poured into the reaction mixture over a period of 5 minutes, warming the reaction mixture but not refluxing the solvent; and finally, the remaining 118 ml was added and the suspension was stirred at room temperature for 6 hours.

The reaction was quenched by adding 2 L of 1M HCl and stirred for 5–10 minutes. NaCl (100 ml saturated) was added and the layers were separated. The organic layer was then washed with potassium carbonate (1 L of 2M) and the layers were separated. The organic layers were evaporated under vacuum, leaving the crude CPM. Any remaining water was decanted off the crude CPM. The crude CPM was divided roughly into thirds and each portion was dissolved in a minimum amount of methylene chloride and passed through 1 kg of silica gel in a 3 L sintered glass Buchner funnel, no vacuum, using 2% MeOH/methylene chloride as eluent (approximately 8 L per portion). The desired fractions from all three portions were combined and the solvent evaporated under vacuum. The partially-purified product was resubmitted to the same silica gel treatment described above. Evaporation of the solvent and the recombining of the three portions yielded 725 g of the azo cyan dye (Compound (i)) which is a 63% overall yield from Compound F. This material was virtually one spot by TLC ($R_f$ 0.6, 5% MeOH/methylene chloride) with only small amounts of less polar impurities. HPLC analysis showed 100% (area) purity of the CPM: the $\lambda_{max}$ in DMSO was 640, with an $\epsilon$ of 55,000.

EXAMPLE III

Preparation of the Azo Magenta Dye

The azo cyan and azo magenta dyes may be synthesized using the following common intermediate:

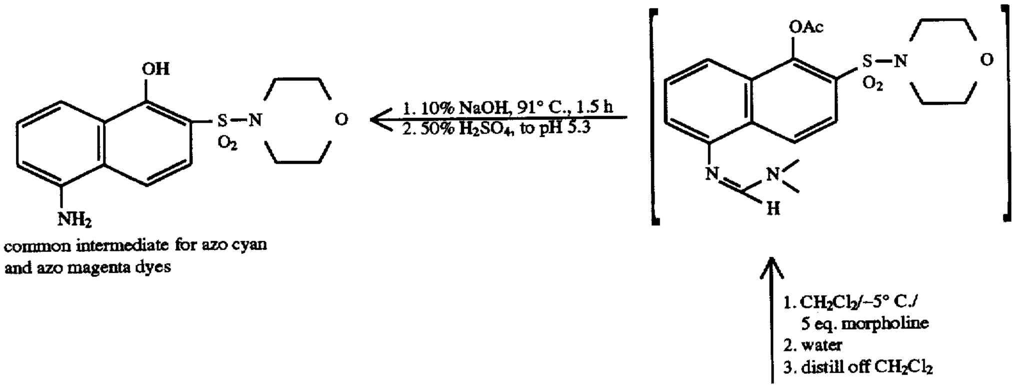

common intermediate for azo cyan and azo magenta dyes

-continued
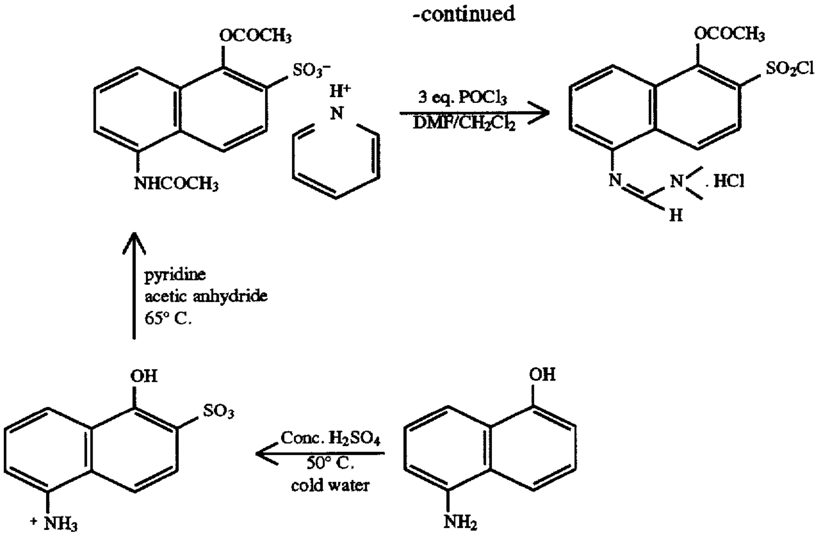
The following compounds were used in the preparation of the Azo Magenta Dye:
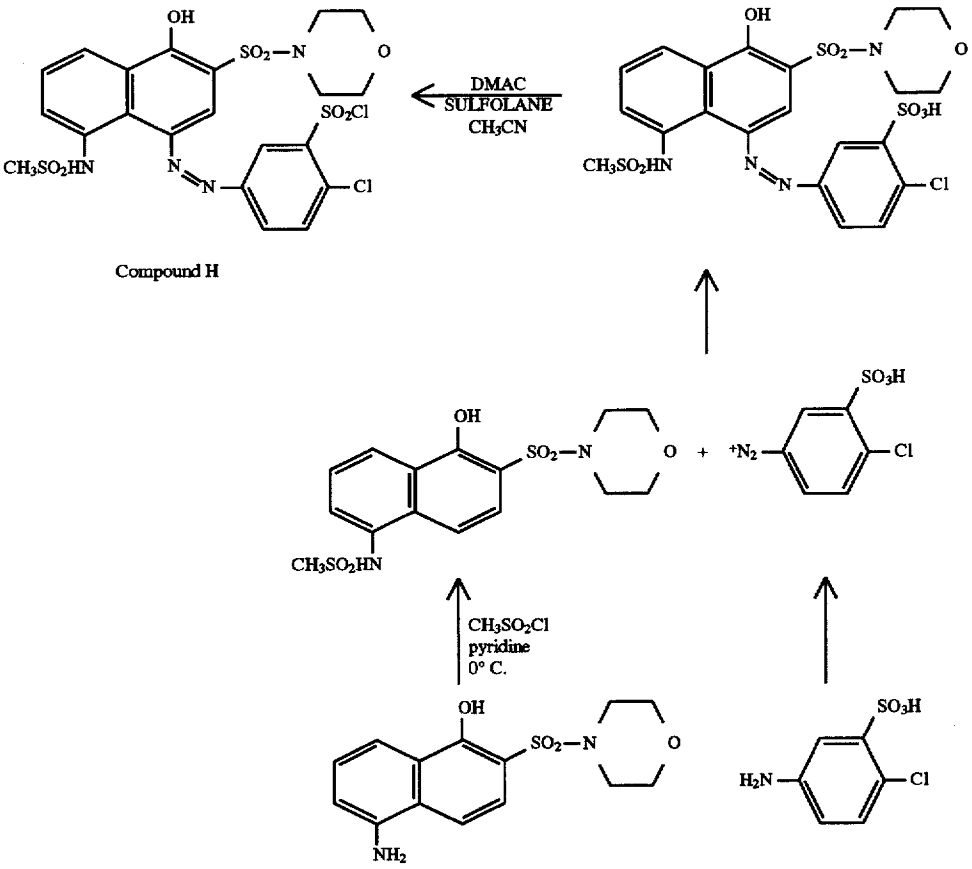
Compound H -continued

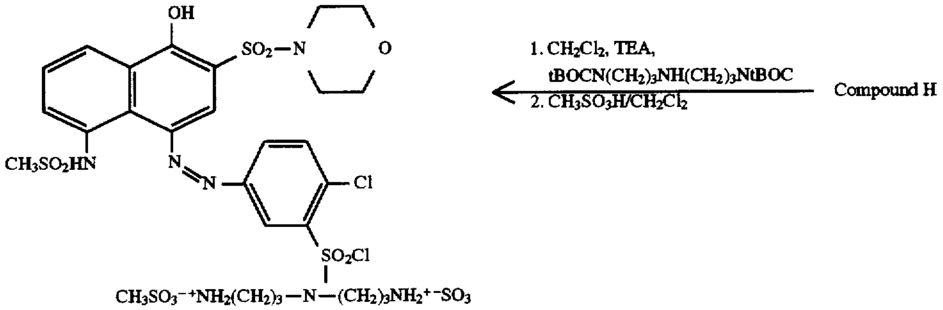

Compound I

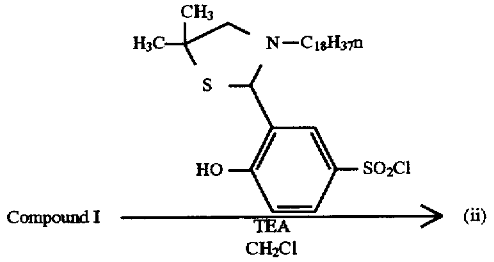

350 grams (0.5 mol) of magenta sulfonyl chloride (Compound H) in 3.5 liters of methylene chloride was stirred in a 12 liter 4-necked round bottom flask equipped with a mechanical stirrer, addition funnel, thermometer and nitrogen inlet tube. Next, 204 grams (0.615 mol) of bis t-BOC triamine was added to the flask, causing the initial suspension to become more homogeneous and to take on a magenta color. 157 mls (1.12 mol) of triethylamine was then added dropwise over the course of 30–45 minutes during which the reaction pot temperature increased to 35° C. The reaction was allowed to proceed (approx. 2 hours) with stirring to completion.

Next, 350 ml (5.4 mol) of methane sulfonic acid was added dropwise over a 2 hour period, causing the reaction temperature to once again increase to 35° C. A reflux was maintained for several hours after the dropwise addition was completed. The result of the reflux, a reddish-orange salt, was isolated over a dacron fabric covered Buchner funnel. Then, the salt was washed with methylene chloride (approx. 4 liters) until it was light in color. The salt (bis methane sulfonic acid chromophore salt; Compound I) was then either air dried or further reacted as a wet cake.

The magenta color-providing material was then synthesized from the bis methane sulfonic acid chromophore salt (Compound I) and TSC. Specifically, the bis methane sulfonic acid chromophore salt was stirred in 4 liters of methylene chloride while 555 ml (4 mol) of TEA was added dropwise over a 45 minute period, resulting in a nearly homogeneous reaction mixture. Next, 605 grams (1.03 mol) of TSC in 1.5 liters of methylene chloride was added to the reaction over the course of 1–1.5 hours. The reaction was then stirred overnight.

Work-up was then performed in a 12 liter round bottom flask by subsequent aqueous washes. The first wash used 3 liters of 1N HCl. The aqueous acid wash broke up in about 1–2 hours. The second wash used saturated KCl. The third wash used 2N potassium carbonate. The organic layer was then stirred overnight in the flask with the drying agent, sodium sulfate.

Then, after filtering from the drying agent, the methylene chloride was concentrated to approximately 2 liters and applied to a silica gel packed column (4 kg of silica gel packed as a slurry from 1:1 hexanes:methylene chloride). The column was initially 1:1 hexanes:methylene chloride, then straight methylene chloride followed by 2% methanol/methylene chloride at which time the desired magenta color-providing material fractions began to elude. A final eluent change to 5% methanol/methylene chloride eluded the remaining desired magenta color-providing material fractions from the silica gel.

Finally, the fractions were divided into 2 lots; stirred over solid potassium carbonate until the deep magenta color was observed; and then, concentrated to a tacky oil. A final hexanes chase yielded 636 g of magenta CPM (Compound (ii)) which is a 63% overall yield from Compound H. The results from analytical testing: UV/Vis$\lambda_{max}$ in DMSO was 560 nm, with an $\epsilon$ of 35,500.

EXAMPLE IV

Image-Recording Element Utilizing the Color-Provided Compounds

In the following example, the light-sensitive layers used a pure silver bromide 0.92 μm mono-dispersed emulsion prepared by standard techniques known in the art. Sensitization was performed using a spectral dye first technique known in the art. The blue-sensitive emulsion did not use a blue spectral sensitizing dye. The green emulsion used a green spectral sensitizing dye. The red emulsion used a red spectral sensitizing dye. The red and green emulsions were also chemically-sensitized using gold and sulfur.

The color-providing material and the reducing agents used in the example were added to the coating compositions as dispersions. The various dispersions were prepared by the specific procedures described below or by analogous procedures but using different reagents as noted. In addition, images have been obtained using a broad range of emulsion with respect to grain size, iodide levels, sensitization and morphology. The other components of the layers, e.g., succinaldehyde, when added were added to the coating compositions as aqueous solutions.

(1) Zinc Oxide Dispersion 5 g of zinc oxide powder (particle size of 0.1 microns), 0.3 g of 25% aqueous Daxad-30 and 14.7 g of water were allowed to grind for 24 hours using ⅛" mullite beads in an attritor. The dispersion was diluted with water during the isolation of the beads from the zinc oxide to a concentration of approximately 20%.

(2) Dispersion of Color-Providing Compounds 5.0 g of dye (yellow, magenta or cyan) and 5.0 g of 10% aqueous Airvol-205 (PVA) were added to 10.0 g of water. This mixture was then allowed to grind for 48 hours (yellow or magenta) or for 24 hours (cyan) in an attritor using ⅛" mullite beads. The dispersion was diluted with water during isolation of the dye from the beads to a concentration of approximately 20%.

(3) Silver Ligand Dispersion 5.0 g of Compound (A), i.e., 6-butylthiomethyluracil, 1.0 g of 20% triton X-100, 5.8 g of 6.5% aqueous Tamol-731 (adjusted to pH 7) and 8.2 g of water were allowed to grind for 24 hours using ⅛" mullite beads in an attritor. The dispersion was diluted with water during the isolation of the beads from the ligand to a concentration of approximately 20%.

(4) Reducing Agent Dispersion 5.0 g of Graphidone B, i.e., 4-methyl-phenidone, 2.5 g of 10% aqueous Alkanol XC, 0.1 g of ascorbyl palmitate and 12.4 g water were allowed to grind for 24 hours using ⅛" mullite beads in an attritor. The dispersion was diluted with water during the isolation of the beads from the reducing agent to a concentration of approximately 20%.

(5) Silver Scavenger Dispersion 5 g of Compound D, i.e., scavenger, 2.5 g of 10% aqueous PVA, 1.25 g of 20% aqueous Triton X-100 and 11.25 g of water were first slurried in a meyers mill until a uniform mixture was achieved. The slurry was ground in a Dyno-Mill using 0.8 mm glass beads. After the grinding, the dispersion was homogenized in order to break up aggregates.

(6) Yellow Filter Dye 4.0 g of 7.5% aqueous Tamol-731 was added to a wet cake (5.0 g dry, Compound G, i.e., benzidine yellow 14) and homogenized until a fine suspension was obtained.

(7) Releasable Antifoggant 5.0 g of Compound B, i.e., releasable antifoggant, 3.85 g of 6.5% aqueous Tamol-731 (adjusted to pH 7) and 11.15 g of water were allowed to grind for 24 hours using ⅛" mullite beads in an attritor. The dispersion was diluted with water during the isolation of the beads from the releasable antifoggant to a concentration of approximately 20%.

The following compounds were used in this example:

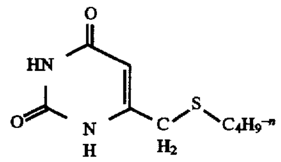

(J)

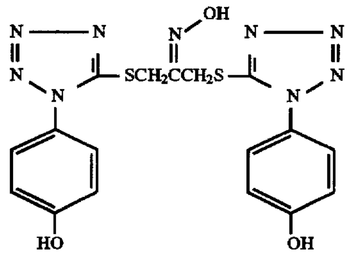

(K)

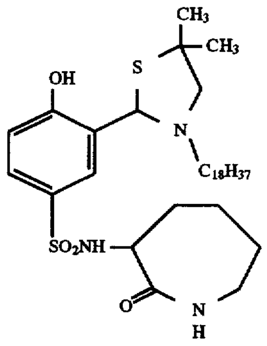

(L)

-continued

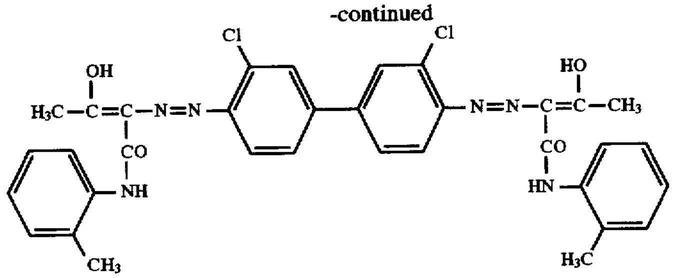

(M)

A heat-developable photosensitive image-recording element which has an alkali-generating system incorporated therein as described in copending, commonly-assigned application Ser. No. 08/753,180 filed on even date herewith which is a continuation-in-part of prior copending application Ser. No. 08/607,680 filed Feb. 26, 1996, was prepared using a slightly water-soluble metal compound, i.e., zinc oxide, and a ligand, i.e., a sodium salt of 2-hydroxypyridine-N-oxide, wherein the photosensitive material comprised a clear polyester film base (carrier SCS) having coated thereon in succession the following layers:

| | |
|---|---|
| **Layer 1** | |
| Compound J (6-Butylthiomethyluracil) | 430 $mg/m^2$ |
| Compound K | 172 $mg/m^2$ |
| Gelatin | 517 $mg/m^2$ |
| Graphidone B (4-methyl-phenidone) | 611 $mg/m^2$ |
| Compound (i) (cyan dye-providing compound) | 517 $mg/m^2$ |
| **Layer 2** | |
| Polyacrylamide | 108 $mg/m^2$ |
| Succinaldehyde | 55 $mg/m^2$ |
| **Layer 3** | |
| Gelatin | 151 $mg/m^2$ |
| Emulsion (red-sensitive) | 344 $mg/m^2$ |
| **Layer 4** | |
| Zinc oxide | 1398.8 $mg/m^2$ |
| Gelatin | 538 $mg/m^2$ |
| Compound L | 3228 $mg/m^2$ |
| **Layer 5** | |
| Compound J | 430 $mg/m^2$ |
| Compound K | 172 $mg/m^2$ |
| Gelatin | 635 $mg/m^2$ |
| Graphidone B | 611 $mg/m^2$ |
| Compound (ii) (magenta dye-providing compound) | 473 $mg/m^2$ |
| **Layer 6** | |
| Polyacrylamide | 106 $mg/m^2$ |
| Succinaldehyde | 65 $mg/m^2$ |
| **Layer 7** | |
| Gelatin | 151 $mg/m^2$ |
| Emulsion (green-sensitive) | 344 $mg/m^2$ |
| **Layer 8** | |
| Zinc oxide | 1398.8 $mg/m^2$ |
| Gelatin | 538 $mg/m^2$ |
| Compound L | 1614 $mg/m^2$ |
| **Layer 9** | |
| Compound J | 430 $mg/m^2$ |
| Compound M | 430 $mg/m^2$ |
| Compound K | 172 $mg/m^2$ |
| Graphidone B | 611 $mg/m^2$ |
| Gelatin | 807 $mg/m^2$ |
| Compound (iii) (yellow dye-providing compound) | 1033 $mg/m^2$ |

-continued

| | |
|---|---|
| **Layer 10** | |
| Polyacrylamide | 106 $mg/m^2$ |
| Succinaldehyde | 65 $mg/m^2$ |
| **Layer 11** | |
| Gelatin | 151 $mg/m^2$ |
| Emulsion (blue-sensitive) | 344 $mg/m^2$ |
| **Layer 12** | |
| Zinc oxide | 1398.8 $mg/m^2$ |
| Gelatin | 538 $mg/m^2$ |
| **Layer 13** | |
| Gelatin top coat | 200 $mg/m^2$ |

The receiver materials of the element comprised the following layers coated in succession on a white-pigmented polyethylene-coated paper base:

| | |
|---|---|
| **Layer 1** | |
| P4VP | 4500 $mg/m^2$ |
| PVA (Airvol 165) | 900 $mg/m^2$ |
| Diepoxy | 37 $mg/m^2$ |
| 4010 Acrite 100 (copolymer, formaldehyde and acrolein) | 54 $mg/m^2$ |
| **Layer 2** | |
| Gum Arabic (TIC Gums) | 220 $mg/m^2$ |
| **Layer 3** | |
| Gelatin | 2,000 $mg/m^2$ |
| 2-Hydroxypyridine-N-oxide, sodium salt 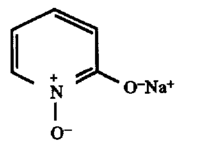 | 12,200 $mg/m^2$ |
| Gelatin hardener | 340 $mg/m^2$ |

Layer 1, i.e., the mordant or "D" coat layer, was coated at a pH of 4.0 adjusted using acetic acid and included Triton X100 (Union Carbide) as the suffactant at 0.038% based on the total volume of coating solution. Layer 2, i.e., the strip coat, was coated at a pH of 12.0 adjusted using ammonium hydroxide and included Triton X100 as the surfactant at 0.1% based on the total volume of coating solution. Layer 3, i.e., the chelating layer, was coated at a pH of 8.5 adjusted using potassium hydroxide and included Zonyl FSN (DuPont) as the surfactant at 0.25% based on the total volume of coating solution.

The assembly was processed by dipping the exposed negative in 42° C. deionized water for 5 seconds. Next, the photosensitive element and the image-receiving sheet were laminated using a zero gap rubber roller resulting in the superimposition of the sheet on the wet photosensitive element for 8 seconds. Then, the whole was immediately placed into a waffle iron and heated for 30 seconds at 90° C. Finally, the whole was removed from the waffle iron and peeled apart.

The maximum reflection density ($D_{max}$) and the minimum reflection density ($D_{min}$) of the resulting image were measured using a reflection densitometer (MacBeth, model RD 514):

| | $D_{max}$ | $D_{min}$ |
|---|---|---|
| Red | 1.84 | 0.12 |
| Green | 1.84 | 0.14 |
| Blue | 1.59 | 0.17 |

As will be apparent, example IV demonstrates the use of the color-providing compounds of the invention in an image-recording element utilizing a peel-apart film configuration; however, as stated earlier, the image-recording elements containing the compounds of the present invention also use other film configurations including integral, as described below in example V.

EXAMPLE V

Image-Recording Element Utilizing the Color-Providing Compounds

As stated earlier, the color-providing compounds of the present invention may be used to form both monochrome and multi-color images. Accordingly, unlike the trichrome structure used in example IV, this example uses a magenta monochrome structure. Furthermore, as mentioned previously, the color-providing compounds of the present invention may be used in film products having various film configurations including peel-apart and integral. Unlike example IV which used a peel-apart configuration, this example uses an integral film configuration.

The various dispersions were prepared by the specific procedures described below or by analogous procedures but using different reagents as noted:

Magneta Dye Dispersion Preparation 5.0 g of magenta dye and 5.0 g of 10% aqueous Airvol-205 (PVA) were added to 10.0 g of water. This mixture was then allowed to grind for 48 hours in an attritor using ⅛" mullite beads. The dispersion was diluted with water during isolation of the dye from the beads to a concentration of approximately 20%.

Aminoreductone Developer Dispersion Preparation 5.0 g of aminoreductone B, 2.5 g of 10% aqueous Alkanol XC, 0.1 g of ascorbyl palmitate and 12.4 g of water were allowed to grind for 24 hours using ⅛" mullite beads in an attritor. The dispersion was diluted with water during the isolation of aminoreductone B from the beads to a concentration of approximately 20%.

A photosensitive image-recording element was prepared wherein the photosensitive material comprised a clear polyester film base having coated thereon in succession the following layers:

| | |
|---|---|
| **Layer 1** | |
| Gelatin | 329 mg/m² |
| Compound (ii) (magenta dye-providing compound) | 646 mg/m² |
| **Layer 2** | |
| Gelatin | 329 mg/m² |
| Emulsion (green-sensitive) | 269 mg/m² |
| **Layer 3** | |
| Gelatin | 329 mg/m² |
| Aminoreductone B | 538 mg/m² |
| **Layer 4** | |
| Gelatin | 53.8 mg/m² |
| Succinaldehyde | 53.8 mg/m² |

The monochrome was first exposed for 0.5 mcs on a xenon exposure device using a sensitometric target. The monochrome was then processed against an image-receiving sheet prepared by obtaining an approximately 3.5 mil melinex transparent base (available from the Imperial Chemical Industries Americas Co.), upon which the following layers are coated in succession:

| | |
|---|---|
| **Layer 1** | |
| Terpolymer (6.7TMQ, 2.3TEQ, 1.0DMQ): Gelatin (2:1)<br>TMQ is trimethylvinylbenzylammonium chloride.<br>TEQ is triethylvinylbenzylammonium chloride.<br>DMQ is dodecyldimethylvinylbenzylammonium chloride. | 2780 mg/m² |
| **Layer 2** | |
| (Igepal CO-997/PVP): Dantoin (1:1.25)<br>Igepal is nonylphenoxyethylene oxide ethanol.<br>PVP is polyvinylpyrrolidone.<br>Dantoin is N-hydroxymethyl pthalimide. | 790 mg/m² |
| **Layer 3** | |
| Petrolite D110: Polyox (N80) (3:1)<br>Petrolite D110 is a 10% unithox 480 ethoxylated alcohol, $H_{61}C_{30}$—$(CH_2CHO)_{40}$—OH, which contains 0.2% surfanol, as a surfactant. Polyox (N80) is polyethylene glycol 1540, —$(OCH_2CH_2)_n$OH, where n = 4545. | 323 mg/m² |

The monochrome was processed against this image-receiving sheet at a 0.028" gap using a reagent that contained the following components: 43–70% $TiO_2$, 5.03% KOH, 1.24% Carbopol (thickener), 0.63% colloidal silica, 44.4% water and 5.0% methylthiouracil. After processing, the negative/positive sandwich was kept in a black box for 5 minutes before bringing it out into the light.

The $D_{max}$ and the $D_{min}$ of the resulting magenta monochrome image were measured as described previously. The image-recording material gave $D_{max}$=2.01 and $D_{min}$=0.08.

Since certain changes may be made in the above subject matter without departing from the spirit and scope of the invention herein involved, it is intended that all matter contained in the above description and the accompanying example be interpreted as illustrative and not in any limiting sense.

What is claimed is:

1. A compound represented by the formula:

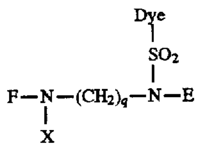

wherein:

Dye represents a complete dye or dye intermediate;

q is 2, 3 or 4;

X is

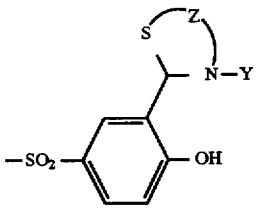

wherein:

Z represents the carbon atoms necessary to complete a 5- or 6-membered heterocyclic ring system;

Y is selected from the group consisting of: alkyl having from 1 to 22 carbon atoms, alkyl having from 1 to 22 carbon atoms substituted with $R_6$, cyclohexyl, cyclohexyl substituted with $R_6$, phenyl, phenyl substituted with $R_6$, 1-naphthyl, 1-naphthyl substituted with $R_6$, aralkyl having from 7 to 18 carbon atoms, aralkyl having from 7 to 18 carbon atoms substituted with $R_6$, 2-pyridyl and 2-pyridyl substituted with $R_6$, wherein $R_6$ is selected from the group consisting of trifluoromethyl, 2-propenyl, methoxy, ethoxy, 2,4-di-t-amylphenoxy, acetyloxy, methanesulfonyloxy, dimethylamino, anilino, p-t-octylanilino, methanesulfonylamino, p-toluenesulfonyl, cyclohexyl, 2-pyridyl and

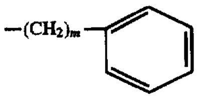

wherein m is 1, 2 or 3; and

E and F are each independently hydrogen or

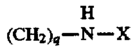

provided that at least one of E and F is

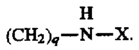

2. A compound as defined in claim 1 represented by the formula

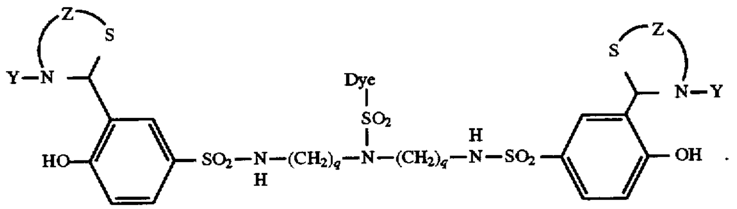

3. A compound as defined in claim 1 represented by the formula

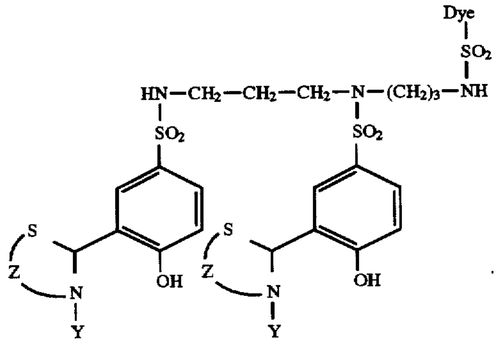

4. A compound as defined in claim 1 wherein Z represents the atoms necessary to complete a thiazolidine moiety.

5. A compound as defined in claim 4 represented by the formula:

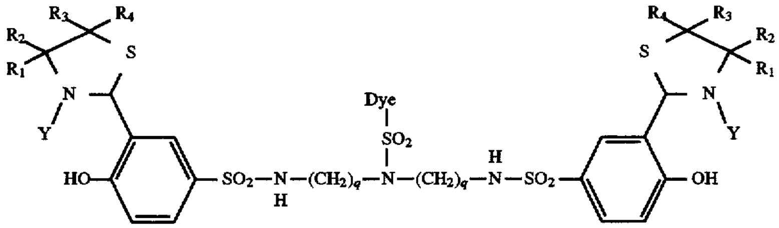

wherein:

$R_1$, $R_2$, $R_3$, and $R_4$ are each independently hydrogen or a monovalent organic radical; or taken together, $R_1$ and $R_2$, $R_2$ and $R_3$, or $R_3$ and $R_4$ represent a 5-or 6-membered carbocyclic or heterocyclic ring.

6. A compound as defined in claim 5 wherein Y is alkyl having from 10 to 22 carbon atoms or aralkyl having from 12 to 18 carbon atoms, and $R_1$, $R_2$, $R_3$ and $R_4$ are hydrogen or methyl.

7. A compound as defined in claim 1 wherein said Dye is selected from the group consisting of

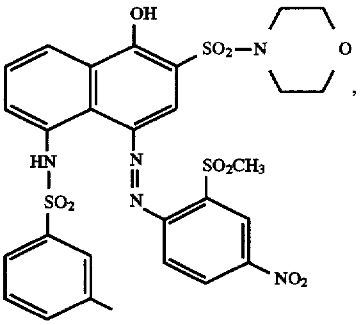

,

-continued

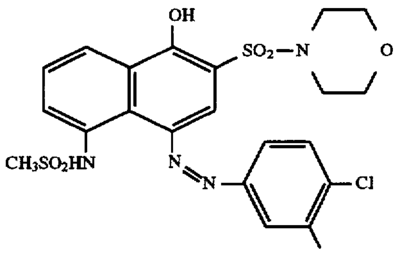

and

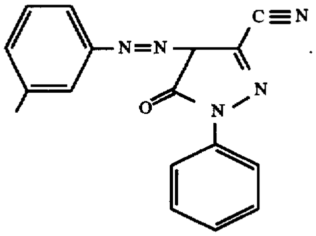

.

* * * * *